(12) United States Patent
Ceder et al.

(10) Patent No.: US 8,529,800 B2
(45) Date of Patent: Sep. 10, 2013

(54) OXIDES HAVING HIGH ENERGY DENSITIES

(75) Inventors: Gerbrand Ceder, Wellesley, MA (US); Kisuk Kang, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 755 days.

(21) Appl. No.: 11/992,782

(22) PCT Filed: Sep. 29, 2006

(86) PCT No.: PCT/US2006/037838
§ 371 (c)(1),
(2), (4) Date: Jun. 25, 2010

(87) PCT Pub. No.: WO2007/041209
PCT Pub. Date: Apr. 12, 2007

(65) Prior Publication Data
US 2010/0264381 A1    Oct. 21, 2010

Related U.S. Application Data

(63) Continuation-in-part of application No. 11/333,800, filed on Jan. 17, 2006, now abandoned.

(60) Provisional application No. 60/721,885, filed on Sep. 29, 2005.

(51) Int. Cl.
*H01B 1/08* (2006.01)
*C01D 15/02* (2006.01)
*H01M 4/48* (2010.01)

(52) U.S. Cl.
USPC .................................... 252/518.1; 252/521.2

(58) Field of Classification Search
USPC ................. 252/518.1, 521.2; 423/218.1, 223, 423/224, 231.95
See application file for complete search history.

(56) References Cited

U.S. PATENT DOCUMENTS 5,264,201 A    11/1993 Dahn et al.
5,981,106 A *  11/1999 Amine et al. ............ 429/224

(Continued)

FOREIGN PATENT DOCUMENTS

EP    1450423 A1    8/2004
EP    1652819 A1    5/2006

(Continued)

OTHER PUBLICATIONS

Julien Breger, et al. "Short- and Long-Range Order in the Positive Electrode Material, Li(NiMn)$_{0.5}$O$_2$: A Joint X-ray and Neutron Diffraction, Pair Distribution Function Analysis and NMR Study" J. Am. Chem. Soc. 2005, 127, 7529-7537.

(Continued)

*Primary Examiner* — Mark Kopec
(74) *Attorney, Agent, or Firm* — Wolf, Greenfield & Sacks, P.C.

(57) ABSTRACT

Certain disclosed embodiments generally relate to oxide materials having relatively high energy and/or power densities. Various aspects of the embodiments are directed to oxide materials having a structure $B_i(M_jY_k)O_2$, for example, a structure $Li_i(Ni_jY_k)O_2$ such as $Li(Ni_{0.5}Mn_{0.5})O_2$. In this structure, Y represents one or more atoms, each independently selected from the group consisting of alkaline earth metals, transition metals, Group 14 elements, Group 15, or Group 16 elements. In some embodiments, such an oxide material may have an O3 crystal structure, and/or a layered structure such that the oxide comprises a plurality of first, repeating atomic planes comprising Li, and a plurality of second, repeating atomic planes comprising Ni and/or Y.

23 Claims, 17 Drawing Sheets

(56) References Cited

U.S. PATENT DOCUMENTS

| | | | |
|---|---|---|---|
| 6,511,647 | B1 | 1/2003 | Coowar |
| 6,551,744 | B1 | 4/2003 | Ohzuku et al. |
| 6,656,635 | B2 | 12/2003 | Okawa et al. |
| 6,815,122 | B2 * | 11/2004 | Barker et al. ............. 429/231.9 |
| 2002/0192552 | A1 | 12/2002 | Lampe-Onnerud et al. |
| 2003/0022063 | A1 | 1/2003 | Paulsen et al. |
| 2003/0108793 | A1 | 6/2003 | Dahn et al. |
| 2003/0170540 | A1 | 9/2003 | Ohzuku et al. |
| 2004/0179993 | A1 | 9/2004 | Dahn et al. |
| 2004/0214086 | A1 | 10/2004 | Bruce et al. |

FOREIGN PATENT DOCUMENTS

| | | |
|---|---|---|
| JP | 10211935 | 1/2000 |
| JP | 10299562 | 5/2000 |

OTHER PUBLICATIONS

International Search Report from International Applicatin No. PCT/US2006/037838, filed Sep. 29, 2006.

Kisuk Kang, et al. "Electrodes with High Power and High Capacity for Rechargeable Lithium Batteries" Science vol. 311, Feb. 17, 2006, pp. 977-980.

J.M. Paulsen, et al. "O2 Structure $Li_{frax;2;3}[Ni_{1/3}Mn_{frax;2;3}]O_2$: A New Layered Cathode Material for Rechargeable Lithium Batteries" Journal of the Electrochemical Society, 147 (3) pp. 861-868 (2000).

J.M. Paulsen, et al. "Studies of the layered managanese bronzes, $Na_{frax;2;3}[Mn_{1-x}M_x]O_2$ with M=Co, Ni, Li, and $Li_{frax;2;3}[Mn_{1-x}M_x]O_2$ prepared by ion-exchange" Solid State Ionics 126 (1999) pp. 3-24.

J.M. Paulsen, et al. "O2 Structure $Li_{frax;2;3}[Ni_{1/3}Mn_{frax;2;3}]O_2$: A New Layered Cathode Material for Rechargeable Lithium Batteries" Journal of the Electrochemical Society, 147 (8) pp. 2862-2867 (2000).

J.M. Paulsen, et al. "$O_2$-Type $Li_{frax;2;3}[Ni_{1/3}Mn_{frax;2;3}]O_2$: A New Layered Cathode Material for Rechargeable Lithium Batteries" Journal of the Electrochemical Society, 147 (7) 2478-2485 (2000).

Tracey E. Quine, et al. "Layered $Li_xMn_{1-y}Ni_yO_2$ intercalation electrodes" J. Mater. Chem., 2000, 10, pp. 2838-2841.

E. Rossen, et al. "Structure and electrochemistry of $Li_xMn_yNi_{1-y}O_2$" Solid State Ionics 57 (1992) 311-318.

Won-Sub Yoon, et al. "Local Structure and Cation Ordering in O3 Lithium Nickel Manganese Oxides with Stoichiometry $Li[Ni_xMn_{(2-x)/3}]O_2$" Electrochemical and Solid-State Letters, 7 (7) pp. A167-A171 (2004).

Yoshinari Makimura, et al. "Lithium insertion material of $LiNi_{frax;1;2}Mn_{frax;1;2}O_2$ for advanced lithium-ion batteries" Journal of Power Sources 119-121 (2003) 156-160.

Zhonghua Lu, et al. "T2 and O2 $Li_{frax;2;3}[Co_xNi_{1/3-x/2}Mn_{frax;2;3-x/2}]O_2$ Electrode Materials" Journal of the Electrochemical Society, 149 (8) A1083-A1091 (2002).

Zhonghua Lu, et al. "Lack of Cation Clustering in $Li[Ni_xLi_{1/3-2x/3}Mn_{frax;2;3-x/3}]O_2$ ($0 > x \leq 1/2$) and $Li[Cr_xLi_{(1-x)/3}Mn_{2-2x)/3}]O_x$ ($0 > x > 1$)" Chem. Mater 2003, 15, 3214-3220.

* cited by examiner

O atomic plane, A configuration ⎫
Li atomic plane, B configuration ⎪
O atomic plane, C configuration ⎪
Ni/Y atomic plane, A configuration ⎪
O atomic plane, B configuration ⎪
Li atomic plane, C configuration ⎪ Unit
O atomic plane, A configuration ⎬ Cell
Ni/Y atomic plane, B configuration ⎪
O atomic plane, C configuration ⎪
Li atomic plane, A configuration ⎪
O atomic plane, B configuration ⎪
Ni/Y atomic plane, C configuration ⎭
O atomic plane, A configuration
Li atomic plane, B configuration
O atomic plane, C configuration
Ni/Y atomic plane, A configuration
O atomic plane, B configuration
Li atomic plane, C configuration
O atomic plane, A configuration
Ni/Y atomic plane, B configuration
O atomic plane, C configuration
Li atomic plane, A configuration
O atomic plane, B configuration
Ni/Y atomic plane, C configuration

OXIDES HAVING HIGH ENERGY DENSITIES

RELATED APPLICATIONS

This application is a national-stage application under 35 U.S.C. §371 of Int. Patent Application Serial No. PCT/US2006/037838, filed Sep. 29, 2006, entitled "Oxides Having High Energy Densities," by Ceder, et al., which is a continuation-in-part of U.S. patent application Ser. No. 11/333,800, filed Jan. 17, 2006, entitled "Oxides Having High Energy Densities," by Ceder, et al., which application claims the benefit of U.S. Provisional Patent Application Ser. No. 60/721,885, filed Sep. 29, 2005, entitled "Oxides Having High Energy Densities," by Ceder, et al., each of which is incorporated herein by reference.

GOVERNMENT FUNDING

This invention was made with U.S. Government support under grant number DE-AC02-05CH11231 awarded by the Department of Energy and grant number DMR0213282 awarded by the National Science Foundation. The U.S. Government has certain rights in this invention.

FIELD OF INVENTION

The present invention generally relates to certain oxide materials having relatively high energy and/or power densities.

BACKGROUND

Lithium oxide materials comprising transition metal ions are of great interest for rechargeable lithium batteries and similar applications, where the storage of electrical energy is desired. These materials will often have layered structures, where the Li ions and transition metal ions occupy distinct layers. Lithium oxide materials are useful in the storage of electrical energy, and thus such structures can be used to produce high performance rechargeable lithium batteries and the like. An example of such a material is $Li(Ni_{0.5}Mn_{0.5})O_2$, for example, as discussed in Makimura and Ohzuku, "Lithium insertion material of $LiNi_{1/2}Mn_{1/2}O_2$ for advanced lithium-ion batteries," *J. Power Sources*, 119-121 (2003), p. 156-160. However, in this material, as discussed in Makimura and Ohzuku, some of the Li and Ni atoms are exchanged in their relative positions in the crystal structure due to various electrostatic and elastic interactions. Additionally, the presence of high valence $Mn^{4+}$, which has a tendency to surround the low valence $Li^+$ in the transition metal layer, may enhance the exchange of Li and Ni in prior art manufacturing and synthesis techniques, which can cause a decrease in performance. Accordingly, improvements in lithium oxide materials are needed.

SUMMARY OF THE INVENTION

The present invention generally relates to certain oxide materials that can be used as rechargeable battery materials, which are relatively highly ordered and which have relatively high energy and/or power densities. The subject matter of the present invention involves, in some cases, interrelated products, alternative solutions to a particular problem, and/or a plurality of different uses of one or more systems and/or articles.

In one aspect, the present invention is directed to a composition. The composition, in a first set of embodiments, comprises an oxide having a structure $B_i(N_jT_mY_k)O_2$, where i is greater than 0, j is greater than about 0.2, k is greater than about 0.2, m is less than about 0.25, and (j+k+m) is between about 0.95 and about 1.05; Y represents one or more atoms, each independently selected from the group consisting of transition metals other than cobalt, Group 13 elements other than aluminum, Group 14 elements, Group 15 elements, Group 16 elements, or magnesium; B represents one or more atoms that are not T or Y such that at least about 90% of B; is lithium; B has a combined valency of $Z_B$ and Y has a combined valency of $Z_y$, (i $Z_B$+2 j+k $Z_y$+3 m) being between about 3.8 and 4.2; and the oxide comprises a plurality of first, repeating atomic planes comprising B and a plurality of second, repeating atomic planes comprising Ni and/or Y and/or T, the plurality of first, repeating atomic planes having less than about $$\left(22.5\left(\frac{1}{3} - m\right)\right)\%$$

by number of Ni and/or Y and/or T compared to the total number of atoms present within the plurality of first, repeating atomic planes, as determined by $^6Li$ NMR.

In another set of embodiments, the composition includes an oxide having a structure $B_i(Ni_jT_mY_k)O_2$, where i is greater than 0, j is greater than about 0.2, k is greater than about 0.2, m is less than about 0.25, and (j+k+m) is between about 0.95 and about 1.05; T is cobalt and/or aluminum; Y represents one or more atoms, each independently selected from the group consisting of transition metals other than cobalt, Group 13 elements other than aluminum, Group 14 elements, Group 15 elements, Group 16 elements, or magnesium; B represents one or more atoms that are not T or Y such that at least about 90% of $B_i$ is lithium; B has a combined valency of $Z_B$ and Y has a combined valency of $Z_y$, $Z_B$+2 j+k $Z_y$+3 m) being between about 3.8 and 4.2; and the oxide comprises a plurality of first, repeating atomic planes comprising B and a plurality of second, repeating atomic planes comprising Ni and/or Y and/or T, the plurality of first, repeating atomic planes having at least about 90% by number of B atoms compared to the total number of atoms present within the first, repeating atomic planes, the oxide having a hexagonal crystal structure, and an a lattice parameter and a c lattice parameter such that c/a is greater than about 4.95.

In yet another set of embodiments, the composition includes an oxide, having a structure $B_i(Ni_jT_mY_k)O_2$, where i is greater than 0, j is greater than about 0.2, k is greater than about 0.2, m is less than about 0.25, and (j+k+m) is between about 0.95 and about 1.05; T is cobalt and/or aluminum; Y represents one or more atoms, each independently selected from the group consisting of transition metals other than cobalt, Group 13 elements other than aluminum, Group 14 elements, Group 15 elements, Group 16 elements, or magnesium; 13 represents one or more atoms that are not T or Y such that at least about 90% of B; is lithium; 13 has a combined valency of $Z_B$ and Y has a combined valency of $Z_y$, $Z_B$+2 j+k $Z_y$+3 m) being between about 3.8 and 4.2; and the oxide is present in the composition as a plurality of crystallites, the plurality of crystallites defining a numerically-average crystallite having a first spatial dimension, a second spatial dimension, and a third spatial dimension, each of the first, second, and third spatial dimensions being defined by the three basis vectors of a unit crystal cell defined by the crystallite, one of the first, second, and third spatial dimensions not being substantially equal to either of the other two spatial dimensions.

The composition, according to still another set of embodiments, comprises an oxide, having a structure $B(Ni_jT_mY_k)O_2$, where i is greater than 0, j is greater than about 0.2, k is greater than about 0.2, m is less than about 0.25, and (j+k+m) is between about 0.95 and about 1.05; T is cobalt and/or aluminum; Y represents one or more atoms, each independently selected from the group consisting of transition metals other than cobalt, Group 13 elements other than aluminum, Group 14 elements, Group 15 elements, Group 16 elements, or magnesium; B represents one or more atoms that are not T or Y such that at least about 90% of B; is lithium; B has a combined valency of $Z_B$ and Y has a combined valency of $Z_y$, (i $Z_B$+2 j+k $Z_y$+3 m) being between about 3.8 and 4.2; and the oxide, when used as a positive electrode in an electrochemical cell against a Li anode, charged to 4.6 V, gives, upon discharge to 2.5 V, a capacity of at least about 120 mA h/g at a current rate of at least 280 mA/g.

In one set of embodiments, the composition comprises an oxide having a structure $Li_i(Ni_jY_k)O_2$, where i is greater than 0, j is greater than 0, k is greater than about 0.2, and (j+k) is between about 0.95 and about 1.05; Y represents one or more atoms, each independently selected from the group consisting of alkaline earth metals, transition metals, Group 13 elements, Group 14 elements, Group 15 elements, Group 16 elements, or magnesium, Y having a combined valency of at least about 4; and the oxide comprises a plurality of first, repeating atomic planes comprising Li and a plurality of second, repeating atomic planes comprising Ni and/or Y. In some cases, the plurality of first, repeating atomic planes has less than about 7.5% by number of Ni and/or Y compared to the total number of atoms present within the plurality of first, repeating atomic planes, as determined by $^6$Li NMR.

The composition, in another set of embodiments, comprises an oxide has a structure $Li_i(Ni_jY_k)O_2$, where i is greater than 0, j is greater than 0, k is greater than about 0.2, and (j+k) is between about 0.95 and about 1.05; Y represents one or more atoms, each independently selected from the group consisting of alkaline earth metals, transition metals, Group 13 elements, Group 14 elements, Group 15 elements, Group 16 elements, or magnesium, Y having a combined valency of at least about 4; and the oxide has a hexagonal crystal structure and a c lattice parameter greater than about 14.325 Angstroms and less than about 14.5 Angstroms.

The composition, in still another set of embodiments, comprises an oxide having a structure $Li_i(Ni_jY_k)O_2$, where i is greater than 0, j is greater than 0, k is greater than about 0.2, and (j+k) is between about 0.95 and about 1.05; Y represents one or more atoms, each independently selected from the group consisting of alkaline earth metals, transition metals, Group 13 elements, Group 14 elements, Group 15 elements, Group 16 elements, or magnesium, Y having a combined valency of at least about 4; and the oxide comprises a plurality of first, repeating atomic planes comprising Li and a plurality of second, repeating atomic planes comprising Ni and/or Y. In some cases, the plurality of first, repeating atomic planes has at least about 90% by number of Li atoms compared to the total number of atoms present within the first, repeating atomic planes. In certain embodiments, the oxide has a hexagonal crystal structure, and an a lattice parameter and a c lattice parameter such that c/a is greater than about 4.95.

In yet another set of embodiments, the composition comprises an oxide having a structure $Li_i(Ni_jY_k)O_2$, where i is greater than 0, j is greater than 0, k is greater than about 0.2, and (j+k) is between about 0.95 and about 1.05; Y represents one or more atoms, each independently selected from the group consisting of alkaline earth metals, transition metals, Group 13 elements, Group 14 elements, Group 15 elements, Group 16 elements, or magnesium, Y having a combined valency of at least about 4; and the oxide is present in the composition as a plurality of crystallites. The plurality of crystallites can be defined by a numerically-average crystallite having a first spatial dimension, a second spatial dimension, and a third spatial dimension, where each of the first, second, and third spatial dimensions are defined by the three basis vectors of a unit crystal cell defined by the crystallite. In some embodiments, one of the first, second, and third spatial dimensions is not substantially equal to either of the other two spatial dimensions.

According to still another set of embodiments, the composition comprises an oxide having a structure $Li_i(Ni_jY_k)O_2$, where i is greater than 0, j is greater than 0, k is greater than about 0.2, and (j+k) is between about 0.95 and about 1.05; Y represents one or more atoms, each independently selected from the group consisting of alkaline earth metals, transition metals, Group 13 elements, Group 14 elements, Group 15 elements, Group 16 elements, or magnesium, Y having a combined valency of at least about 4; and the oxide, when used as a positive electrode in an electrochemical cell against a Li anode, charged to 4.6 V, gives, upon discharge to 2.5 V, a capacity of at least about 120 mA big at a current rate of at least 280 mA/g.

A method of preparing an oxide is provided according to another aspect of the invention. In one set of embodiments, the method includes an act of providing an oxide having an initial average crystallite dimension, the oxide having a structure $A_i(Ni_jT_mY_k)O_2$, where i is greater than 0, j is greater than about 0.2, k is greater than about 0.2, m is less than about 0.25, and (j+k+m) is between about 0.95 and about 1.05; A is selected from the group consisting of H, an alkaline earth, or an alkali metal that is not lithium, A having a valency $Z_A$; T is cobalt and/or aluminum; Y represents one or more atoms, each independently selected from the group consisting of transition metals other than cobalt, Group 13 elements other than aluminum, Group 14 elements, Group 15 elements, Group 16 elements, or magnesium; A has a combined valency of $Z_A$ and Y has a combined valency of $Z_y$, (i $Z_B$+2 j+k $Z_y$+3 m) being between about 3.8 and 4.2, and the oxide comprises a plurality of first, repeating atomic planes comprising A and a plurality of second, repeating atomic planes comprising Ni and/or Y and/or T, the plurality of first, repeating atomic planes having less than about $$\left(22.5\left(\frac{1}{3}-m\right)\right)\%$$

by number of Ni and/or Y and/or T compared to the total number of atoms within the plurality of first, repeating atomic planes.

In one embodiment, the method also includes an act of exchanging, for a period of time, at least some of the A with Li to produce an oxide comprising lithium, such that a ratio of the fraction of final Li phase to the fraction of the unexchanged $A_i(Ni_jT_mY_k)O_2$ phase, as determined from integrated XRD peak intensities in a powder diffraction pattern obtained with Cu-K(alpha) radiation, is greater than about 50%. The method, in another embodiment, includes anact of exchanging at least some of the A with Li to produce an oxide comprising lithium until at least about 50 wt % of the A within the oxide has been replaced by Li. In still another embodiment, the method includes an act of exchanging, for a time of at least 3 hours, at least some of the A with Li to produce an oxide comprising lithium.

In yet another embodiment, the method includes an act of exchanging at least some of the A with Li to produce an oxide having a structure $B_i(Ni_jT_mY_k)O_2$, where B represents one or more atoms that are not T or Y such that at least about 90% of B; is lithium, and the oxide comprises a plurality of first, repeating atomic planes comprising Li and a plurality of second, repeating atomic planes comprising Ni and/or Y and/or T, the plurality of first, repeating atomic planes having less than about $$\left(22.5\left(\frac{1}{3}-m\right)\right)\%$$

by number of Ni and/or Y and/or T compared to the total number of atoms within the plurality of first, repeating atomic planes.

In another set of embodiments, the method includes an act of providing an oxide having an initial average crystallite dimension, the oxide having a structure $A_i(Ni_jY_k)O_2$, where i is greater than 0, j is greater than 0, k is greater than about 0.2, and (j+k) is between about 0.95 and about 1.05; A is selected from the group consisting of H, an alkaline earth, or an alkali metal that is not lithium, A having a valency $Z_A$; Y represents one or more atoms, each independently selected from the group consisting of alkaline earth metals, transition metals, Group 13 elements, Group 14 elements, Group 15 elements, Group 16 elements, or magnesium; and the oxide comprises a plurality of first, repeating atomic planes comprising A and a plurality of second, repeating atomic planes comprising Ni and/or Y, where the plurality of first, repeating atomic planes has less than about 7.5% by number of Ni and/or Y compared to the total number of atoms within the plurality of first, repeating atomic planes. Y may have a combined valency that is at least about (6-2i $Z_A$).

In one embodiment, the method also includes an act of exchanging, for a period of time, at least some of the A with Li to produce an oxide comprising lithium, such that a ratio of the time for exchanging to the square of the initial average crystallite dimension is greater than about 1.5 h/micrometers$^2$. In another embodiment, the method also includes an act of exchanging at least some of the A with Li to produce an oxide comprising lithium until at least about 50 wt % of the A within the oxide has been replaced by Li. In still another embodiment, the method also includes an act of exchanging, for a time of at least 3 hours, at least some of the A with Li to produce an oxide comprising lithium.

The method, in another set of embodiments, includes an act of providing an oxide having a structure $A_i(Ni_jY_k)O_2$, where i is greater than 0, j is greater than 0, k is greater than about 0.2, and (j+k) is between about 0.95 and about 1.05; A is selected from the group consisting of H, an alkaline earth, or an alkali metal that is not lithium, A having a valency $Z_A$; and Y represents one or more atoms, each independently selected from the group consisting of alkaline earth metals, transition metals, Group 13 elements, Group 14 elements, Group 15 elements, or Group 16 elements. Y may have a combined valency that is at least about (6-2i $Z_A$). The method also includes an act of exchanging at least some of the A with Li to produce an oxide having a structure $Li_i(Ni_jY_k)O_2$, where the oxide comprises a plurality of first, repeating atomic planes comprising Li and a plurality of second, repeating atomic planes comprising Ni and/or Y. In some embodiments, the plurality of first, repeating atomic planes has less than about 7.5% by number of Ni and/or Y compared to the total number of atoms within the plurality of first, repeating atomic planes In another aspect, the present invention is directed to a method of making one or more of the embodiments described herein, for example, an oxide material having a structure $Li_i(Ni_jY_k)O_2$, such as $Li(Ni_{0.5}Mn_{0.5})O_2$. In this structure, Y represents one or more atoms, each independently selected from the group consisting of alkaline earth metals, transition metals, Group 13 elements, Group 14 elements, Group 15 elements, or Group 16 elements. Y may have a combined valency of at least about 4 in some cases. In yet another aspect, the present invention is directed to a method of using one or more of the embodiments described herein, for example, an oxide material having a structure $Li_i(Ni_jY_k)O_2$, such as $Li(Ni_{0.5}Mn_{0.5})O_2$.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIGS. 9A-9E illustrate the O3 crystal structure;

DETAILED DESCRIPTION

Figure 1A:
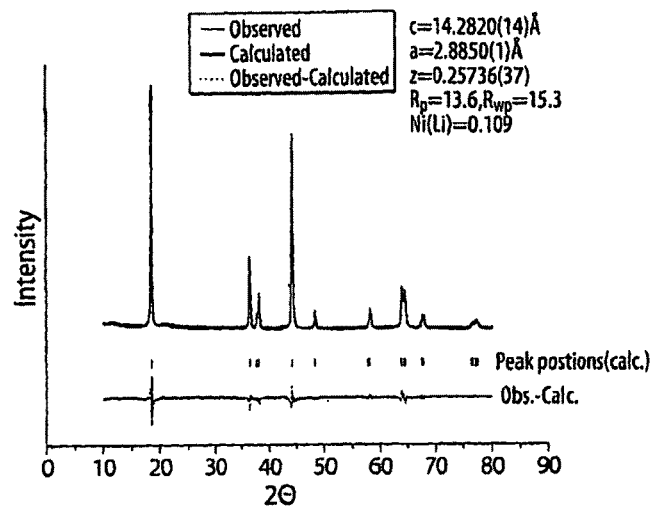
FIGS. 1A-1B illustrate XRD patterns for certain materials of the invention compared to other materials, according to one embodiment of the invention.

The present invention generally relates to certain oxide materials having relatively high energy and/or power densities. It has surprisingly been discovered that lithium oxide electrical energy storage materials analogous to those generally known in the art, even those made by an ion exchange process generally known in the art but not performed under optimal conditions, are provided in a form in which they demonstrate superior electrical energy storage capacity and, relatedly, very low disorder in their crystal structures. The invention results in modification of a generally known procedure in the prior art to achieve this surprising result. At least one prior art reference discloses a similar, yet different, procedure but explicitly states that advantageous properties, such as those realized in accordance with the present invention, were not achieved.

The invention generally relates to lithium oxide materials for rechargeable batteries including a variety of atoms which, ideally, are arranged in a particular ordered structure and which, if not arranged in this ordered structure, do not perform as well in their role are rechargeable battery materials. Some of these materials are known in the prior art, and are known for use as rechargeable battery materials, but have been made by techniques in which a fair amount of disorder exists in the material and therefore the material does not perform as well as would be desired. The present invention provides techniques for making these materials in a manner such that they have a high degree of order, better than that realized in the prior art, and thereby perform better as rechargeable battery storage materials. In some cases, the techniques of the invention are somewhat similar to those carried out in the prior art, but with modifications such that significantly better ordered materials result. Thus, in one aspect, the invention represents a surprising and unexpected result based upon modification of the prior art, providing significantly better rechargeable battery storage materials which has been an aggressively-sought goal in the art for a significant period of time.

Various aspects of the invention are directed to oxide materials having a structure $B_i(Ni_jT_mY_k)O_2$, i.e., materials comprising $B_i(Ni_jT_mY_k)O_2$ oxides. In this structure, T (when present) is cobalt or aluminum, and B represents one or more atoms such that at least about 70%, at least about 80%, at least about 90% or at least about 95% of $B_i$ is Li. Typically, B is not T or Y. In some cases, nearly 100% of B is Li, i.e., the material comprises a $Li_i(Ni_jT_mY_k)O_2$ oxide such as an $Li_i(Ni_jY_k)O_2$ oxide. In other cases, more than one B may be present. For instance, $B_i$ in this structure may represent $B^1_{i_1}$, $B^1_{i_1}B^2_{i_2}$, $B^1_{i_1}B^2_{i_2}B^3_{i_3}$, ..., etc. Each of the atoms in $B_i$ may be any element, for example, an alkali metal such as Li, an alkaline earth metal, a transition metal, etc., and each of $i_1, i_2, i_3, \ldots$, etc. is an independent number (i.e., each of $i_1, i_2, i_3, \ldots$, etc. may the same or different).

Y represents one or more atoms, each independently selected from the group consisting of alkaline earth metals, transition metals (in some cases, other than cobalt), Group 13 elements (in some cases, other than aluminum), Group 14 elements, Group 15 elements Group 16 elements, or magnesium, for example, as in the structure $Li(Ni_{0.5}Mn_{0.5})O_2$. In certain cases, Y has a combined valency of at least about 4, although in other cases, Y can be less than 4. In some embodiments, for example, when Y contains Mn, the average valence of Mn within Y may be above about 3.75. It should be noted that the structures disclosed herein are structures for the fully discharged state of the oxide material, i.e., when all of the lithium or other B ions are present within the material (upon charging, some Li may be removed from this structure).

In one set of embodiments, if B has a combined valency of $Z_B$ and Y has a combined valency of 4, the elements in the structure $B_i(Ni_jT_mY_k)O_2$ are chosen such that (i $Z_B$+2j+k $Z_Y$+3 m) being between about 3.8 and 4.2, or between about 3.9 and 4.1. In some cases, (i $Z_B$+2 j+k $Z_Y$+3 m) is chosen to be about 4.

In some embodiments, an oxide material of the invention having a structure $B_i(Ni_jY_k)O_2$, such as $Li_i(Ni_jY_k)O_2$, may have an O3 crystal structure, and/or a layered structure such that the oxide material includes a plurality of first, repeating atomic planes comprising B, and a plurality of second, repeating atomic planes comprising Ni and/or Y. It is a feature of the invention that techniques and compositions are provided in which relatively little exchange of atoms takes place between the atomic planes. For example, in some embodiments, such exchange is inhibited such that less than 8% of the Li planes comprises Ni and/or Y atoms, and/or such that less than 8% of the Ni/Y planes comprises Li. In certain embodiments, such exchange is inhibited such that less than 8% of the about $$\left(24\left(\frac{1}{3}-m\right)\right)\%$$

of the B planes comprises Ni and/or Y and/or T atoms, and/or such that less than about $$\left(24\left(\frac{1}{3}-m\right)\right)\%$$

of the Ni/Y/T planes comprises B. In other cases, the exchange may be inhibited such that less than about $$\left(22.5\left(\frac{1}{3}-m\right)\right)\%,$$

less than about $$\left(21\left(\frac{1}{3}-m\right)\right)\%,$$

less than about $$\left(18\left(\frac{1}{3}-m\right)\right)\%,$$

less than about $$\left(15\left(\frac{1}{3}-m\right)\right)\%,$$

less than about $$\left(12\left(\frac{1}{3}-m\right)\right)\%,$$

less than about $$\left(9\left(\frac{1}{3}-m\right)\right)\%,$$

less than about $$\left(6\left(\frac{1}{3}-m\right)\right)\%,$$

or less than about $$\left(3\left(\frac{1}{3}-m\right)\right)\%$$

of the B planes comprising Ni and/or Y and/or T atoms, and/or such that less than about $$\left(22.5\left(\frac{1}{3}-m\right)\right)\%,$$

less than about $$\left(21\left(\frac{1}{3}-m\right)\right)\%,$$

less than about $$\left(18\left(\frac{1}{3}-m\right)\right)\%,$$

less than about $$\left(15\left(\frac{1}{3}-m\right)\right)\%,$$

less than about $$\left(12\left(\frac{1}{3}-m\right)\right)\%,$$

less than about $$\left(9\left(\frac{1}{3}-m\right)\right)\%,$$

less than about $$\left(6\left(\frac{1}{3}-m\right)\right)\%,$$

or less than about $$\left(3\left(\frac{1}{3}-m\right)\right)\%$$

of the Ni/Y/T planes comprises B. In some cases, the oxide materials may have relatively high charge storage densities, for example, of at least about 180 mA h/g.

The invention, in another aspect, is directed to methods of making such oxide materials. For example, in one embodiment, an oxide material having a structure $B_i(Ni_jT_mY_k)O_2$, such as $Li_i(Ni_jT_mY_k)O_2$ or $Li_i(Ni_jY_k)O_2$, may be prepared by providing an oxide material having a structure $A_i(Ni_jT_mY_k)O_2$, and exchanging the A for B ions, e.g., via an ion exchange process. A may be hydrogen, an alkaline earth, or an alkali metal that is not lithium. Yet other aspects of the invention are directed to other oxide materials having similar structures and/or characteristics. In some cases, the oxide materials are produced using ion exchange processes, such as those described above. Still other aspects of the invention are directed to methods of using any of these oxide materials, methods of promoting such oxide materials, devices containing such oxide materials, and the like.

In one aspect, the present invention is directed to oxide materials comprising lithium, for example, having a structure $Li_i(Ni_jT_mY_k)O_2$ (or $B_i(Ni_jT_mY_k)O_2$, where at least some of the B atoms are lithium), where i, j, and k are each greater than 0. m may be 0 or greater than 0. As is known to those of ordinary skill in the art, each of i, j, and k may independently be an integer or a fraction (e.g., 0.2, 0.25, ⅓, 0.5, ⅔, 0.75, etc.). In some embodiments, j is chosen to be greater than about 0.2, about ¼, or about ⅓. For example j may be about ½, about ⅔, or about ¾. In certain cases, i is about 1.

In certain embodiments, j, k, and m in the structure $Li_i(Ni_jT_mY_k)O_2$ or $B_i(Ni_jT_mY_k)O_2$ are chosen such that the sum of j, k, and m, (j+k+m), is between about 0.95 and about 1.05, or between about 0.97 and about 1.03. For example, if the atoms forming the Y portion of the structure have a combined valency of about 4 and B is Li, then j may be about 0.5, k may be about 0.5, and m may be about 0, i.e., $Li_i(Ni_{0.5}Y_{0.5})O_2$. Thus, substantially the same number of Ni and Y atoms are present within the oxide material. As another example, if Y has a combined valency of about 5 and B is Li, then j may be about ⅔, k may be about ⅓, and m may be about 0, i.e., $Li(Ni_{2/3}Y_{1/3})O_2$, for example, as in the structure $Li(Ni_{2/3}Nb_{1/3})O_2$. Thus, there are approximately 2 Ni for every Y in the structure. As yet another example, if Y has a combined valency of about 6 and B is Li, then j may be about ¾, k may be about ¼, and m may be about 0, i.e., $Li_i(Ni_{3/4}Y_{1/4})O_2$, for example, as in the structure $Li(Ni_{3/4}Mo_{1/4})O_2$. Thus, there are approximately 3 Ni for every Y in the structure. It should be noted that in these structures, fractions such as "⅔" and "¾" are not necessarily exact. For example, the oxide material may be overdoped or underdoped in Li, Ni, Y, etc. The ratio of Ni to Y can be controlled within the oxide material, in some embodiments, by varying the concentrations of the starting salts, as discussed in further detail below. Similarly, the ratio of $Li_i$ or $B_i$ and $Ni_jY_k$ can be controlled by varying the ratios between the Li or B source (and/or the Na source, as discussed below) and the sources of Ni and/or Y.

In other embodiments, j and k in the structure $Li_i(Ni_jY_k)O_2$ are chosen such that the ratio of j to k, (j/k), is between about 0.8 and about 1.2, between about 0.9 and about 1.1, or between about 0.95 and about 1.05. For example, if the atoms forming the Y portion of the structure have a combined valency of about 4, and j and k are each about 0.5, then the ratio of j to k, i.e., the ratio of Ni to Y, is approximately 1. Thus, substantially the same number of Ni and Y atoms are present within the oxide material. As mentioned, the ratio of Ni to Y, and/or the ratio of Li; and $Ni_iY_k$, can be controlled, for instance, as described herein.

In the above structures, Y represents one or more atoms, each independently selected from the group consisting of alkaline earth metals, transition metals (in some cases, other than cobalt), Group 13 elements (in some cases, other than aluminum), Group 14 elements, Group 15 elements, Group 16 elements, or magnesium. For instance, $Y_k$ in this structure may represent $Y^1{}_{k_1}$, $Y^1{}_{k_1}Y^2{}_{k_2}$, $Y^1{}_{k_1}Y^2{}_{k_2}Y^3{}_{k_3}$, ..., etc., where each of $Y^1, Y^2, Y^3, \ldots$, etc. is independently selected from the group consisting of alkaline earth metals, transition metals (in some cases, other than cobalt), Group 13 elements (in some cases, other than aluminum), Group 14 elements, Group 15 elements, Group 16 elements, or magnesium, and each of $k_1$, $k_2$, $k_3$, ..., etc. is an independent number (i.e., each of $k_1$, $k_2$, $k_3$, ..., etc. may the same or different). In some embodiments, the Y's within the structure are chosen such that the combined valence (weighted average) of the Y atoms is greater than about 4. For example, the combined valency of Y may be +4, +5, +6, etc. As discussed above, the combined valency may not necessarily be exact, for example, if the oxide material is overdoped or underdoped.

As non-limiting examples, Y may contain manganese, aluminum, magnesium, titanium, niobium, zirconium, etc. In certain embodiments, Y may contain manganese and at least 1% of aluminum, magnesium, titanium, niobium, and/or zirconium.

In some cases, one or more of the Y atoms may have a relatively high valency, for example, 4, 5, 6, or more in some cases. Examples of single atoms having a valency of 4 that may be suitable for Y include, but are not limited to, $Ti^{4+}$, $Zr^{4+}$, $Hf^{4+}$, $Mn^{4+}$, $Mo^{4+}$, $Sn^{4+}$, $Ge^{4+}$, $Si^{4+}$, or $Fe^{4+}$. Non-limiting examples of single atoms having a valency of 5 that may be suitable include $Nb^{5+}$, $Ta^{5+}$, $Cr^{5+}$, $V^{5+}$, $P^{5+}$, $As^{5+}$, or $Sb^{5+}$. Non-limiting examples of single atoms having a valency of 6 that may be suitable include $Mo^{6+}$, $W^{6+}$, $Cr^{6+}$, or $Sn^{6+}$. As mentioned above, in some cases, more than one Y may be present, so long as the combined valence for Y is at least about 4.

As used herein, an "alkali metal" is given its ordinary meaning as used by those of ordinary skill in the art, i.e., an element from Group 1 of the Periodic Table. Non-limiting examples of alkali metals include lithium, sodium, potassium, and rubidium. Similarly, an "alkaline earth" is given its ordinary meaning as used by those of ordinary skill in the art, i.e., an element from Group 2 of the Periodic Table. Examples of alkaline earths include, but are not limited to, beryllium, calcium, magnesium, strontium, and barium. A "transition metal" or a "transition element," as used herein, is also given its ordinary meaning as used by those of ordinary skill in the art, with reference to the Periodic Table. Non-limiting examples of transition metals include scandium, titanium, vanadium, chromium, manganese, iron, cobalt, nickel, copper, zinc, yttrium, zirconium, niobium, molybdenum, rubidium, rhodium, palladium, silver, cadmium, lutetium, hafnium, tantalum, tungsten, rhenium, osmium, iridium, platinum, gold, mercury, and the lanthanides. Similarly defined are Group 13, Group 14, Group 15, and Group 16 elements, in reference to the Periodic Table. Non-limiting examples of Group 13 elements are boron, aluminum, gallium, and indium; non-limiting examples of Group 14 elements are carbon, silicon, germanium, and tin; non-limiting examples of Group 15 elements are nitrogen, phosphorous, arsenic, and antimony; and non-limiting examples of Group 16 elements are oxygen, sulfur, selenium, and tellurium.

One non-limiting example of a structure where $Y_k$ represents more than one atom is $B_i(Ni_jCo_mY_k)O_2$. In certain embodiments, an oxide material having a structure $B_i(Ni_jCo_mY_k)O_2$ may have a layered structure such that the oxide material includes a plurality of first, repeating atomic planes comprising B and a plurality of second, repeating atomic planes comprising Ni and/or Y, where the plurality of first, repeating atomic planes can have less than about $$\left(22.5\left(\frac{1}{3}-m\right)\right)\%$$

(by number) of Ni and/or Y compared to the total number of atoms present within the plurality of first, repeating atomic planes. In other embodiments, the plurality of first, repeating atomic planes has less than about $$\left(21\left(\frac{1}{3}-m\right)\right)\%,$$

less man about $$\left(18\left(\frac{1}{3}-m\right)\right)\%,$$

less than about $$\left(15\left(\frac{1}{3}-m\right)\right)\%,$$

less than about $$\left(12\left(\frac{1}{3}-m\right)\right)\%,$$

less than about $$\left(9\left(\frac{1}{3}-m\right)\right)\%,$$

less than about $$\left(6\left(\frac{1}{3}-m\right)\right)\%,$$

or less than about $$\left(3\left(\frac{1}{3}-m\right)\right)\%$$

of Ni and/or Y. In some cases, the oxide material may also include a plurality of second, repeating atomic planes having less than about $$\left(22.5\left(\frac{1}{3}-m\right)\right)\%$$

(by number) of Li, compared to the total number of atoms present within the plurality of second atomic planes, and in certain cases, less than less than about $$\left(15\left(\frac{1}{3}-m\right)\right)\%,$$

less than about $$\left(12\left(\frac{1}{3}-m\right)\right)\%,$$

less than about $$\left(9\left(\frac{1}{3}-m\right)\right)\%,$$

less than about $$\left(6\left(\frac{1}{3}-m\right)\right)\%,$$

or less than about $$\left(3\left(\frac{1}{3}-m\right)\right)\%$$

of Li. As mentioned, NMR techniques such as $^6$Li NMR may be used to determine such characteristics.

In one set of embodiments, the oxide material has an O3 crystal structure (Hagenmueller-Delmas nomenclature), i.e., formed by repetition of a O3 unit crystal cell. Those of ordinary skill in the art will understand the arrangement of an O3 crystal structure, and be able to distinguish the O3 crystal structure from other, similar crystal structures, for example, O2, O1, P2, T2, or the like. The O3 crystal structure has a number of identifiable repeating, generally parallel atomic planes or layers, each defined by a particular type of atom(s).

Figure 9A:
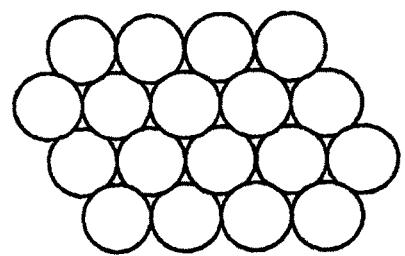
Figure 9B:
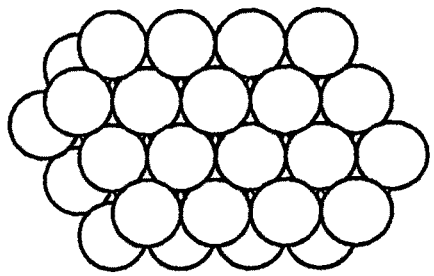
Figure 9C:
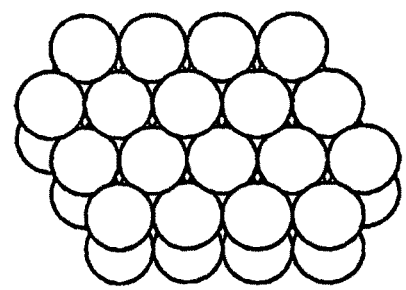

The O3 crystal structure of a structure such as $B_i(Ni_jT_mY_k)O_2$ (as discussed herein) may be constructed as follows. Each atomic plane can be thought of as a close-packed layer of atoms in a hexagonal arrangement, as is shown in FIG. 9A. On top of each atomic plane, another atomic plane can be positioned thereon in more than one arrangement, designated as "A," "B," and "C," i.e., in the "A" configuration, a second atomic plane is positioned on a first atomic plane such that an atom is positioned in position "A," as is shown in FIG. 9B. Similarly, with the "B" configuration, the second atomic plane is positioned on a first atomic plane such that an atom is positioned in position "B," as is shown in FIG. 9C. In the "C" configuration (not shown), the second atomic plane is positioned such that the atoms of the second atomic plane are positioned directly above the atoms of the first atomic plane. In the O3 structure of $Li_i(Ni_jY_k)O_2$, as is shown in the non-limiting example of FIG. 9D, the atomic planes can comprise either Li atoms (forming a Li-defined plane), O atoms (forming an O-defined plane), or Ni and/or Y atoms (forming a Ni/Y-defined plane). The atomic planes within the O3 structure are arranged in a repeating structure as follows:

O—Li—O—Ni/Y—...

However, the configuration of the atomic planes within the O3 structure is as follows:

A-B—C—...

Figure 9E:
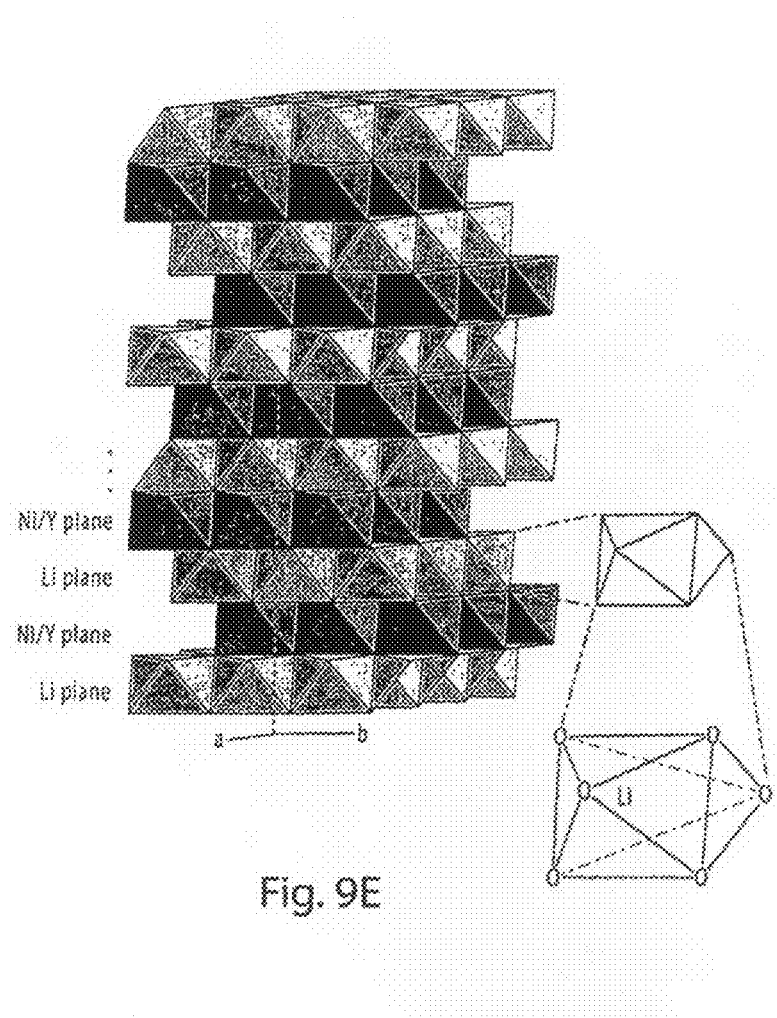

The combination of these two repeating structures results in a unit cell that comprises 12 atomic planes:

$O_A$—$Li_B$—$O_C$—$Ni/Y_A$—$O_B$—$Li_C$—$O_A$—$Ni/Y_B$—
$O_C$—$Li_A$—$O_B$—$Ni/Y_C$—..., which then repeat to form the O3 material. The above description can be generalized to the $B_i(Ni_jT_mY_k)O_2$ discussed herein, i.e., the unit cell of such a material will comprise 12 atomic planes as follows:

$O_A$—$B_B$—$O_C$—$Ni/Y/T_A$-$O_B$—$B_C$—$O_A$—$Ni/Y/T_B$-
$O_C$—$B_A$—$O_B$—$Ni/Y/T_C$-...

which then repeat to form the O3 material. In this material, lattice parameters a and b are defined within an atomic plane, while the c lattice parameter is defined to be in the direction of atomic plane stacking, as is shown schematically in FIG. 9E. In FIG. 9E, the vertexes of the octahedrons represent O atoms, while the interiors of the octahedrons represent Li, or Ni or Y, depending on the atomic plane, as is shown in the expanded view of a unit octahedron in FIG. 9E.

Thus, as an example, in an oxide material having a structure $B_i(Ni_jT_mY_k)O_2$ having the form of an O3 crystal structure (for example, $Li(Ni_{0.5}Mn_{0.5})O_2$, i.e., where B is lithium, m is 0, and Y is Mn), a first set of repeating atomic planes may be defined by the (resting) positions of the Li atoms within the crystal structure, while a second set of repeating atomic planes, distinguishable from the first set of atomic planes, may be defined by the (resting) positions of the Ni and/or Y and/or T atoms within the crystal structure.

In one set of embodiments, an oxide material of the invention having an O3 structure can thus be identified by measuring the lattice parameters of the crystal structure of the material. Lattice parameters of the crystal structure can be measured using techniques known to those of ordinary skill in the art, for example, using X-ray diffraction measurements. As known to those of ordinary skill in the O3 structure can be characterized as having a, b, and c lattice parameters, c being the distance between atomic planes within the O3 structure, as is shown in FIG. 9. Without wishing to be bound to any theory, it is believed that the oxide materials of the invention have larger c lattice parameters than those previously reported, as the presence of disorder within an O3 structure, e.g., atomic exchange within atomic planes in the O3 structure, such as Li—Ni exchange, causes the layers to be drawn closer together, resulting in smaller c lattice parameters.

Thus, in one embodiment, an oxide material having a structure $Li_i(Ni_jY_k)O_2$ may have a c lattice parameter greater than about 14.325 Angstroms (Å) and less than about 14.5 Angstroms. Such c lattice parameters can be obtained, for example, when the amount of exchange of atoms between a first atomic plane and a second atomic plane of the O3 crystal structure is less than about 10%, less than about 8%, less than about 7.5%, less than about 7%, less than about 6.5%, less than about 6%, less than about 5%, less than about 4%, less than about 3%, less than about 2%, or less than about 1%, etc., as previously described. In other embodiments, the c lattice parameter may be greater than about 14.40 Angstroms and less than about 14.45 Angstroms.

In another embodiment, the ratio of the c lattice parameter to the a lattice parameter (which is measured within an atomic plane) may be greater than about 4.95, greater than about 4.97, greater than about 5.00, greater than about 5.02, or greater than about 5.05.

It should be noted that the above description of the O3 crystal structure is an idealized situation. This can be the case with compositions falling within the structure $B_i(Ni_jT_mY_k)O_2$, and similar materials, in which atoms such as Li and Ni have a tendency to become exchanged, as previously described. Thus, the atomic planes within the O3 crystal structure may also be described in terms of a percentage (by number) of atoms that have exchanged between the atomic planes of the ideal O3 structure. Such percentages can be determined using techniques known to those of ordinary skill in the art, for example, x-ray diffraction (XRD) (Rietvelt refinement), nuclear magnetic resonance (NMR) techniques (e.g., $^6$Li NMR), magnetic measurements, or the like, for instance, as further described below.

The oxide materials of the present invention, in some embodiments, have O3 crystal structures having relatively little exchange of atoms between the various repeating atomic planes within the O3 crystal structure. For example, in some cases, a first atomic plane of the O3 crystal structure may have less than about 10% (by number) of an atom that does not belong in the first atomic plane and properly belongs in a second atomic plane of the O3 crystal, structure. In other cases, the first atomic plane may have less than about 8%, less than about 7.5%, less than about 7%, less than about 6.5%, less than about 6%, less than about 5%, less than about 4%, less than about 3%, less than about 2%, or less than about 1% of an atom that properly belongs in a second plane of the O3 crystal structure. In other cases, a first atomic plane of the O3 crystal structure may have less than about $$\left(30\left(\frac{1}{3}-m\right)\right)\%$$

(by number) of an atom that does not belong in the first atomic plane and properly belongs in a second atomic plane of the O3 crystal structure. In other cases, the first atomic plane may have less than about $$\left(24\left(\frac{1}{3}-m\right)\right)\%,$$

less than about $$\left(22.5\left(\frac{1}{3}-m\right)\right)\%,$$

less than about $$\left(21\left(\frac{1}{3}-m\right)\right)\%,$$

less than about $$\left(19.5\left(\frac{1}{3}-m\right)\right)\%,$$

less man about $$\left(18\left(\frac{1}{3}-m\right)\right)\%,$$

less than about $$\left(15\left(\frac{1}{3}-m\right)\right)\%,$$

less than about $$\left(12\left(\frac{1}{3}-m\right)\right)\%,$$

less than about $$\left(9\left(\frac{1}{3}-m\right)\right)\%,$$

less than about $$\left(6\left(\frac{1}{3}-m\right)\right)\%,$$

or less than about $$\left(3\left(\frac{1}{3}-m\right)\right)\%$$

of an atom that properly belongs in a second plane of the O3 crystal structure.

In still other cases, the first atomic plane may be substantially free of atoms that properly belong in a second plane of the O3 crystal structure, i.e., less than a detectable amount of those atoms may be present within the first atomic plane, e.g., as determined using the techniques described herein. For instance, in one embodiment, in a material comprising a structure $Li_i(Ni_jY_k)O_2$ (for example, $Li(Ni_{0.5}Mn_{0.5})O_2$), a first atomic plane may be defined by Li and a second atomic plane may be defined by Ni and/or Y atoms, where the first (Li-defined) atomic plane may have less than about 10%, less than about 8%, less than about 7.5%, less than about 7%, etc. by number of Ni and/or Y, and/or the second (Ni/Y) atomic plane may have less than about 10%, less than about 8%, less than about 7.5%, less than about 7%, etc. by number of Li. In some cases, the amount of Li—Ni exchange or disorder may be less than about 10%, less than about 8%, less than about 7.5%, less than about 7%, less than about 6.5%, less than about 6%, less than about 5%, less than about 4%, less than about 3%, less than about 2%, or less than about 1%. In another embodiment, in a material comprising a structure $B_i(Ni_j T_m Y_k)O_2$ (for example, $Li(Ni_{0.5}Mn_{0.5})O_2$), a first atomic plane may be defined by B and a second atomic plane may be defined by Ni and/or Y and/or T atoms, where the first (B-defined) atomic plane may have less than about $$\left(30\left(\frac{1}{3}-m\right)\right)\%,$$

less than about $$\left(24\left(\frac{1}{3}-m\right)\right)\%,$$

less than about $$\left(22.5\left(\frac{1}{3}-m\right)\right)\%,$$

less than about $$\left(21\left(\frac{1}{3}-m\right)\right)\%,$$

etc. by number of Ni and/or Y and/or T, and/or the second (Ni/Y/T) atomic plane may have less than about $$\left(30\left(\frac{1}{3}-m\right)\right)\%,$$

less than about $$\left(24\left(\frac{1}{3}-m\right)\right)\%,$$

than about less than about $$\left(22.5\left(\frac{1}{3}-m\right)\right)\%,$$

less than about $$\left(21\left(\frac{1}{3}-m\right)\right)\%,$$

etc. by number of B. In some cases, the amount of Li—Ni exchange or disorder (or other exchange with B) may be less than about $$\left(30\left(\frac{1}{3}-m\right)\right)\%,$$

less than about $$\left(24\left(\frac{1}{3}-m\right)\right)\%,$$

less than about $$\left(22.5\left(\frac{1}{3}-m\right)\right)\%,$$

less than about $$\left(21\left(\frac{1}{3}-m\right)\right)\%,$$

less than about $$\left(19.5\left(\frac{1}{3}-m\right)\right)\%,$$

less than about $$\left(18\left(\frac{1}{3}-m\right)\right)\%,$$

less than about $$\left(15\left(\frac{1}{3}-m\right)\right)\%,$$

less than about $$\left(12\left(\frac{1}{3}-m\right)\right)\%,$$

less than about $$\left(9\left(\frac{1}{3}-m\right)\right)\%,$$

less than about $$\left(6\left(\frac{1}{3}-m\right)\right)\%,$$

or less than about $$\left(3\left(\frac{1}{3}-m\right)\right)\%.$$

Equivalently, an atomic plane within the O3 crystal structure may be described as having a percentage (by number) of atoms that properly belong within that atomic plane, as compared to the total number of atoms actually present within that atomic plane (e.g., the other atoms may belong in other atomic planes within the O3 crystal structure). For example, in an oxide material of the present invention, an atomic plane may have at least about 90% (by number), at least about 92%, at least about 92.5%, at least about 93%, at least about 93.5%, at least about 94%, at least about 95%, at least about 96%, at least about 97%, at least about 98%, or at least about 99% or more of atoms that properly belong within the atomic plane, compared to the total number of atoms within that atomic plane. In some cases, an atomic plane may have at least about $$\left(270\left(\frac{1}{3}-m\right)\right)\%$$

(by number), at least about $$\left(276\left(\frac{1}{3}-m\right)\right)\%,$$

at least about $$\left(277.5\left(\frac{1}{3}-m\right)\right)\%,$$

at least about $$\left(279\left(\frac{1}{3}-m\right)\right)\%,$$

at least about $$\left(280.5\left(\frac{1}{3}-m\right)\right)\%,$$

at least about $$\left(282\left(\frac{1}{3}-m\right)\right)\%,$$

at least about $$\left(285\left(\frac{1}{3}-m\right)\right)\%,$$

at least about $$\left(288\left(\frac{1}{3}-m\right)\right)\%,$$

at least about $$\left(291\left(\frac{1}{3}-m\right)\right)\%,$$

at least about $$\left(294\left(\frac{1}{3}-m\right)\right)\%,$$

or at least about $$\left(297\left(\frac{1}{3}-m\right)\right)\%$$

or more of atoms that properly belong within the atomic plane, compared to the total number of atoms within that atomic plane.

Those of ordinary skill in the art will know of suitable techniques for determining the exchange of ions within an oxide material, and/or determining the number of atoms within a set of atomic planes within a crystal structure, such as an O3 crystal structure. For example, in one set of embodiments, Rietvelt refinement of carefully collected x-ray diffraction (XRD) patterns may be used to determine characteristics of an oxide material, including those described herein, such as the degree of exchange of atoms within the material, i.e., the percentage of atoms of a first atomic plane that have been exchanged with atoms of a second atomic plane. As an example, XRD may be used to determine the Li—Ni exchange or disorder within a $B_i(Ni_jT_mY_k)O_2$ material such as $Li(Ni_{0.5}Mn_{0.5})O_2$. A non-limiting example of the use of a method of x-ray diffraction to determine Li—Ni disorder is described below in the examples. In such x-ray measurements using XRD, it can be important to have no preferential texture in the x-ray sample, as such texture may bias the intensity of some peaks and thereby prevent an accurate Rietvelt refinement. As another example, NMR techniques may be used to determine characteristics of an oxide material. For instance an oxide material may be prepared that contains one or more spin-labeled elements that can be detected using NMR techniques, for instance, $^6Li$ and/or $^{17}O$ in the case of a $B_i(Ni_jT_mY_k)O_2$ material such as $Li(Ni_{0.5}Mn_{0.5})O_2$. As an example, for $^6Li$ NMR, the frequency band for Li within the Ni layer in a $Li_i(Ni_jY_k)O_2$ structure may be measured between about 1300 ppm and about 1560 ppm, while Li within the B plane may be between about 590 ppm and about 720 ppm.

Certain oxide materials of the present invention are able to form a crystallite structure, according to another set of embodiments, as is understood by those of ordinary skill in the art, i.e., the oxide material, in solid form, contains a plurality of crystal domains. Although the crystallites within the solid can vary in size and shape, an average crystallite can be defined as the numerical average of the crystallites within the solid structure.

In certain embodiments of the invention, the crystallites may be generally non-spherical. For instance, in some cases, the crystallites may adopt a flattened, layered, or "platelet" morphology, i.e., such that the average crystallite has a first spatial dimension, a second spatial dimension, and a third spatial dimension, where one of the dimensions is not substantially equal to either of the other two dimensions. The spatial dimensions are defined in the directions of the basis vectors of a unit crystal cell defined by the crystallite, and are orthogonal in certain cases. Without wishing to be held to any theory, it is believed that such morphologies can be created due to the increased layering order of the oxide materials, as the oxide materials have only a limited amount of exchange of atoms.

Certain oxide materials of the invention also possess novel properties, potentially due to the limited amount of exchange of atoms within the oxide material, according to another aspect of the invention. Limited exchange can result in higher energy densities, enhanced cycling characteristics, higher power densities, better crystallinity or crystallite structures, etc.

For instance, in one set of embodiments, the materials may exhibit a relatively high charge density or energy density, i.e., the capacity of the material to contain electric charge, e.g., as measured in charge per unit volume. Materials having such properties may be useful for applications such as rechargeable lithium batteries and similar applications, where the storage of electrical energy is desired. For example, in one embodiment, an oxide material of the invention may exhibit an energy density or capacity of at least about 120 mA h/g, and in some cases, at least about 130 mA h/g, at least about 140 mA h/g, at least about 150 mA h/g, at least about 160 mA h/g, at least about 170 mA h/g, at least about 180 mA h/g, at least about 190 mA h/g, at least about 200 mA h/g, or at least about 215 mA h/g, etc. as measured at a discharge rate of 6 C(C=280 mA/g), or 1680 mA/g. It should be noted that the energy density actually measured is a function of the discharge rate, for example, as is illustrated in FIG. 3B. Thus, in another embodiment, an oxide material of the invention may exhibit at least about 120 mA h/g, at least about 130 mA h/g, at least about 130 mA h/g, at least about 140 mA h/g, at least about 150 mA h/g, at least about 160 mA h/g, at least about 170 mA h/g, at least about 180 mA h/g, at least about 190 mA h/g, at least about 200 mA h/g, or at least about 215 mA h/g, etc., at a discharge rate of 1 C, or 280 mA/g. Such energy densities may be measured, for example, by using the oxide as a positive electrode in an electrochemical cell against a Li anode, charging the oxide material to 4.6 V, then discharging the oxide material to 2.5 V at a rate of at least about 280 mA/g. The current density at the oxide surface, when used as an electrode, should be less than about 1 mA/cm$^2$ of electrode surface. In still another set of embodiments, the oxide materials of the invention may exhibit enhanced cycling characteristics (i.e., the ability to be charged and discharged repeatedly), relative to other materials.

Another aspect of the invention provides techniques for preparing oxide materials comprising lithium, including the oxide materials described herein. For example, certain embodiments of the invention provide techniques for preparing $B_i(Ni_jT_mY_k)O_2$ oxide materials, e.g., $Li_i(Ni_jT_mY_k)O_2$ oxide materials such as $Li(Ni_{0.5}Mn_{0.5})O_2$ oxides. In one set of embodiments, an starting oxide material comprising a cation A is prepared, and then A is exchanged with an alkali metal, for instance, through ion exchange or similar processes. For example, in one embodiment, an oxide material having a structure $A_i(Ni_jT_mY_k)O_2$, for example, $Na_i(Ni_jT_mY_k)O_2$, is prepared, and then at least a portion of A within the oxide material is exchanged for Li, thereby producing $Li_i(Ni_jT_mY_k)O_2$. In this example, this can be accomplished, for instance, by exposing the oxide material to a solution containing dissolved Li$^+$ ions, for example, arising from Li salts such as LiBr, LiI, LiNO$_3$, LiCl, etc., as well as combinations of these and/or other suitable salts. Thus, in one embodiment, a $Na(Ni_{0.5}Mn_{0.5})O_2$ oxide material is prepared, then the Na is ion exchanged with a Li salt to produce $Li(Ni_{0.5}Mn_{0.5})O_2$.

In these structures, as previously discussed, T (when present) is cobalt and/or aluminum, and Y represents one or more atoms, each independently selected from the group consisting of alkaline earth metals, transition metals (in some cases, other than cobalt), Group 13 elements (in some cases, other than aluminum), Group 14 elements, Group 15 elements, Group 16 elements, or magnesium. In some embodiments, the Y's within the structure are chosen such that the combined valence (weighted average) of the Y atoms is at least about (6-2i $Z_A$), where $Z_A$ is the valency of A in the structure $A_i(Ni_jY_k)O_2$. For instance, if i=1 and $Z_A$=1, then the combined valence of the Y atoms should be at least about 4. Similarly, if i=1 and $Z_A$=2, then the combined valence of the Y atoms should be at least about 2.

In one set of embodiments, if A has a combined valency of $Z_A$ and Y has a combined valency of $Z_y$, the elements in the structure $A_i(Ni_jT_mY_k)O_2$ may be chosen such that (i $Z_B$+2 j+k $Z_Y$+3 m) being between about 3.8 and 4.2, or between about 3.9 and 4.1. In some cases, (i $Z_B$+2 j+k $Z_Y$+3 m) is chosen to be about 4.

A may be any suitable cation, for instance, hydrogen (H), an alkaline earth, or an alkali metal that is not lithium. In some cases, A is a Group 1 element, a Group 2 element, or lanthanum, and in some instances, less than 10% of A is a Group 1 element other than lithium, a Group 2 element, or lanthanum. In the structure $A_i(Ni_jT_mY_k)O_2$, and k are each be greater than 0, and in some cases, j is greater than about 0.2. In one set of embodiments, (j+k+m) is between about 0.95 and about 1.05, or between about 0.97 and about 1.03. The ion exchange solution may comprise a salt of the alkali metal (such as a Li salt), dissolved in a solvent such as water, hexanol, ethanol, methanol, etc. In some cases, the alkali metal may be provided in stoichiometric excess relative to A within the oxide material. For instance, Li$^+$ ions may be provided in stoichiometric excess, relative to the $A_i(Ni_jT_mY_k)O_2$ oxide material (i.e., such that more Li is present than A), for instance, in a 5-fold or 10-fold excess.

In one set of embodiments, the starting $A_i(Ni_jT_mY_k)O_2$ oxide material is chosen to have relatively little exchange of atoms between the various atomic planes within the oxide material. For instance, the oxide material may have a first, repeating atomic plane defined by A and a second atomic plane defined by Ni and/or Y atoms. The first (A-defined) atomic plane may have, in some cases, less than about 10%, less than about 8%, etc. less than about 7.5%, less than about 7%, etc. by number of Ni and/or Y, and/or the second (Ni/Y) atomic plane may have less than about 10%, less than about 8%, etc. by number of A. The oxide material may also have a relatively low amount of exchange between A and Ni, for instance, A-Ni exchange may be less than about 10%, less than about 8%, less than about 7.5%, less than about 7%, less than about 6.5%, less than about 6%, less than about 5%, less than about 4%, less than about 3%, less than about 2%, or less than about 1%.

In certain embodiments, the first (A-defined) atomic plane may have less than about $$\left(30\left(\frac{1}{3}-m\right)\right)\%,$$

less than about $$\left(24\left(\frac{1}{3}-m\right)\right)\%,$$

etc. less than about $$\left(22.5\left(\frac{1}{3}-m\right)\right)\%,$$

less than about $$\left(21\left(\frac{1}{3}-m\right)\right)\%,$$

etc. by number of Ni and/or Y and/or T, and/or the second (Ni/Y/T) atomic plane may have less than about $$\left(30\left(\frac{1}{3}-m\right)\right)\%,$$

less than about $$\left(24\left(\frac{1}{3}-m\right)\right)\%,$$

etc. by number of A. The oxide material may also have a relatively low amount of exchange between A and Ni, for instance, A-Ni exchange may be less than about $$\left(30\left(\frac{1}{3}-m\right)\right)\%,$$

less than about $$\left(24\left(\frac{1}{3}-m\right)\right)\%,$$

less than about $$\left(22.5\left(\frac{1}{3}-m\right)\right)\%,$$

less than about $$\left(21\left(\frac{1}{3}-m\right)\right)\%,$$

less than about $$\left(19.5\left(\frac{1}{3}-m\right)\right)\%,$$

less than about $$\left(18\left(\frac{1}{3}-m\right)\right)\%,$$

less than about $$\left(15\left(\frac{1}{3}-m\right)\right)\%,$$

less than about $$\left(12\left(\frac{1}{3}-m\right)\right)\%,$$

less than about $$\left(9\left(\frac{1}{3}-m\right)\right)\%,$$

less than about $$\left(6\left(\frac{1}{3}-m\right)\right)\%,$$

or less than about $$\left(3\left(\frac{1}{3}-m\right)\right)\%.$$

Such exchange may be routinely determined using techniques such as x-ray diffraction, NMR, etc., as previously described.

In combination with other parameters in the exchange process, the exchange process may be performed for a period of time at least sufficient to exchange most or all of A within the oxide material with the alkali metal, or at least a certain percentage of A with the alkali metal. Simple screening tests can be conducted to determine the length of time that is sufficient (for example, conducting ion exchange for various amounts of time, then determining how much of each alkali metal is present in the final material, using techniques such as XRD, NMR, etc.). A non-limiting example of such a screening test is described in Example 2.

In some embodiments, the exchange process should be performed for a period of time sufficient to exchange at least about 50 wt % (percent by weight) of A with the second alkali metal (for instance, using the $A_i(Ni_jT_mY_k)O_2$ example described above, exchanging Na with Li) and in some cases, at least about 60 wt %, at least about 65 wt %, at least about 70 wt %, at least about 75 wt %, at least about 80 wt %, at least about 85 wt %, at least about 90 wt %, at least about 95 wt %, at least about 96 wt %, at least about 97 wt %, at least about 98 wt %, or at least about 99 wt % or more. Typically, this process can take relatively long times, for example, at least about 2 hours, at least about 3 hours, at least about 4 hours, at least about 5 hours, at least about 6 hours, at least about 7 hours, at least about 8 hours, or at least about 10 hours or more in some cases, depending on factors such as the particle size, the crystallite size of the precursor oxide material, the temperature, the driving force (concentration differences, for instance, between A and the second alkali metal), etc. As noted, these times can be selected by those of ordinary skill in the art with the benefit of the instant disclosure, without undue experimentation, to provide exchange resulting in materials that provide good electrical energy storage and are low in atomic disorder.

For example, if the crystallite size of the precursor oxide material is small, sufficient ion exchange will occur within a shorter period of time, since less transport of A and the alkali metal ions will be required. Similarly, higher temperatures may generally result in faster transport, although in some cases, the temperature should not be at a level that induces atomic disorder, e.g., between an alkali metal and a transition metal. The driving force for diffusion, i.e., the concentration difference of the alkali metals at the surface of the oxide material, may also affect ion exchange. The concentration difference of the alkali metals inside and outside of the oxide material at the surface can be determined by the ratio between the amounts of salts in the exchange medium and precursor. A higher ratio represents a higher driving force for ion exchange. Also, in some cases, replacing the ion exchange medium, after some ion exchange has occurred, with fresh ion exchange medium, may increase ion exchange, for instance, by maintaining higher concentration gradients between the oxide material and the ion exchange medium. Stirring may also help to prevent concentration gradients from being reduced locally at the surface as well.

It should be noted, however, that the temperature at which the ion exchange occurs is not critical. Ion exchange may occur, for example, between an average temperature (of the material) of about 0° C. and about 300° C., between about 50° C. and about 250° C., or between about 100° C. and about 200° C., and the temperature may be held constant or may vary during the ion exchange process. The average temperature can be defined as the temperature of the material, averaged both spatially within the material and with respect to time.

Insufficient ion exchange, which can occur if the exchange process is prematurely stopped, will result in oxide materials not having some or all of the characteristics described herein; for example, the oxide material may have substantial amounts of atoms of A still present within the crystal structure, substantial amounts of intermediate phase other than the O3 type, insufficient energy densities or storage capacities, poor cycling characteristics (i.e., the ability to be charged and discharged repeatedly), or the like.

In some embodiments, the exchange process can be performed such that kappa (κ) in the following equation meets or exceeds a certain threshold, and following the disclosure associated with the equation below, compositions showing good electrical energy storage and low disorder are provided in various embodiments of the invention:

$$\kappa = \frac{\text{Ion exchange time}}{(\text{Average crystallite dimension of precursor material})^2}.$$

The average crystallite dimension is the average of the dimensions of the average crystallite defined by the material (as discussed above), and the precursor material is the material prior to exchange, as previously described. In some embodiments, the threshold is at least about 1.0 h/micrometer$^2$. In other embodiments, the threshold may be at least about 1.2 h/micrometers$^2$, at least about 1.3 h/micrometers$^2$, at least about 1.5 h/micrometers$^2$, at least about 1.6 h/micrometers$^2$, at least about 1.8 h/micrometers$^2$, at least about 2 h/micrometers$^2$, at least about 2.5 h/micrometers$^2$, or at least about 3 h/micrometers$^2$, depending on the desired degree of ion exchange. Lower kappa values may be satisfactory in some cases when factors such as higher temperatures, stirring, higher alkali metal concentrations, using fresh ion exchange solution after some time has passed, and the like are used to promote ion exchange.

In certain embodiments, the exchange process can be performed such that kappa (κ) in the following equation meets or exceeds a certain threshold, and following the disclosure associated with the equation below, compositions showing good electrical energy storage and low disorder are provided in various embodiments of the invention:

$$\kappa = \frac{\text{Integrated XRD peaks of final } B_i(Ni_jT_mY_k)O_2 \text{ phase}}{\text{Integrated XRD peaks of (unexchanged } A_i(Ni_jT_mY_k)O_2 + \text{Intermediate phase)}} * 100(\%).$$

XRD peak intensities can be measured in a powder diffraction pattern obtained with Cu-K$_\alpha$ (Cu-K(alpha)) radiation. In some embodiments, the threshold is at least about 50%. In other embodiments, the threshold may be at least about 60%, at least about 70%, at least about 80%, at least about 90%, at least about 93%, at least about 95%, at least about 97%, or at least about 99%. Short time ion-exchange may be satisfactory in some cases when factors such as higher temperatures, stirring, higher alkali metal concentrations, using fresh ion exchange solution after some time has passed, and the like are used to promote ion exchange.

Oxide materials having the structure $A_i(Ni_jT_mY_k)O_2$, such as $Na_i(Ni_jMn_k)O_2$, $Na_i(Ni_jY_k)O_2$, or $Na_i(Ni_jCO_mY_k)O_2$) or other materials made in accordance with the invention, can be prepared by mixing sources of each element (e.g., $Na_2CO_3$ and/or NaOH as a Na source, $Mn_2O_3$ as an Mn source, $Ni(OH)_2$ as a Ni source, cobalt oxalate as a Co source, etc.), or other appropriate precursors, and heating the mixture to induce a solid-state reaction to occur. Examples of suitable precursors for A include, but are not limited to, oxides (e.g., $TiO_2$ for Ti), halogenated compounds (e.g., $NiCl_2$ for Ni), hydroxides (e.g., CuOH for Cu), carbonates (e.g., $CuCO_3$ for Cu), etc. of A. Stoichiometric amounts of each source can be selected in some cases, depending on the desired final product. For example, use of a 2:1 molar ratio of $Ni(OH)_2$ to $Mn_2O_3$ may be used to produce a final oxide material having a 1:1 ratio of Ni to Mn (i.e., $(Ni_{0.5}Mn_{0.5})$).

In certain embodiments, the elemental sources may be wet ball-milled together, dried, optionally pressed, and heated for a period of time at least sufficient to cause the desired oxide material to form. In some cases, stoichiometric amounts of each elemental source may be used. However, this is not a requirement, and in other cases, non-stoichiometric amounts may be used, for example, to produce an oxide having a surplus or a deficiency in one or more atom types. Optionally, one or more dopant precursors, such as transition metal dopants, may also be added, for example, using a suitable transition metal source.

The above-described materials may find use in rechargeable lithium batteries and similar electrical devices, according to yet another aspect of the invention. Lithium batteries are attractive due to their high energy density, minimal potential for environmental and safety hazard, and low associated materials and processing costs. The lithium battery may be charged, in some cases, by applying a voltage between the electrodes of the battery, which may cause lithium ions and electrons to be withdrawn from lithium hosts at the cathode of the battery. Lithium ions can flow from the cathode to the anode of the battery to be reduced at the anode, the overall process requiring energy. Upon discharge, the reverse occurs; lithium ions and electrons can re-enter the lithium hosts at the cathode while lithium is oxidized to lithium ions at the anode, an energetically favorable process that drives electrons through an external circuit, thereby supplying electrical power to a device to which the battery is connected.

The following examples are intended to illustrate certain embodiments of the present invention, but do not exemplify the full scope of the invention.

Example 1

This example illustrates the synthesis of $Li(Ni_{0.5}Mn_{0.5})O_2$ and materials related to it by substitution. These materials can have much higher energy density than $LiCoO_2$. However, it has not been previously possible to synthesize $Li(Ni_{0.5}Mn_{0.5})O_2$ without significant mixing of Li and the transition metal ions, giving those materials poor capabilities, which make them generally unacceptable in high power applications. In this example, $Li(Ni_{0.5}Mn_{0.5})O_2$ was successfully synthesized with relatively little Li/transition metal ion disorder using a soft chemical method. The obtained $Li(Ni_{0.5}Mn_{0.5})O_2$ material exhibited surprisingly high rate capabilities, for example, more than about 180 mA h/g discharge capacity at a rate of about 1680 mA/g. This material has greater Li motion because of significantly less Li-transition metal ion disorder than conventional $Li(Ni_{0.5}Mn_{0.5})O_2$ materials, which makes it possible that the $Li(Ni_{0.5}Mn_{0.5})O_2$ material of the invention, as described in this example, can be used in the high power Li rechargeable batteries and other applications where the storage of electrical energy is desired. Also in this example, first principle calculations show that the high rate capability of this material may be closely related to the cation exchange and Li slab space.

Li—Ni exchange in $Li(Ni_{0.5}Mn_{0.5})O_2$ materials may be the result of various competing driving forces. The perfect separation of transition metal and Li into each layer may be preferred elastically due to the size difference of the ions. However, electrostatically, high valence $Mn^{+4}$ may have a tendency to surround low valence $Li^+$ in the transition metal layer, which can lead to Li—Ni exchange.

However, in $Na(Ni_{0.5}Mn_{0.5})O_2$, the bigger size difference between Na and transition metal may make the energetic penalty to disorder bigger, thus, the intermixing between Na and Ni may be less. Thus, as illustrated in this example, $Li(Ni_{0.5}Mn_{0.5})O_2$ with very little cation mixing was obtained from a well layered $Na(Ni_{0.5}Mn_{0.5})O_2$ material by ion-exchanging the Na with Li.

The structure of the obtained $Li(Ni_{0.5}Mn_{0.5})O_2$ by ion-exchange (hereinafter IE-$Li(Ni_{0.5}Mn_{0.5})O_2$) was investigated from the Rietveld refinement of the XRD (x-ray diffraction) pattern. For comparisons in structure and electrochemical properties, $Li(Ni_{0.5}Mn_{0.5})O_2$ was also synthesized from the conventional solid state reaction (hereinafter SS—$Li(Ni_{0.5}Mn_{0.5})O_2$).

The solid state reaction sample (SS—$Li(Ni_{0.5}Mn_{0.5})O_2$) was prepared by the mixed hydroxide method using $LiOH\cdot H_2O$ (98%, EM), $Ni(NO_3)_2 \cdot 6H_2O$ (99.999%, Aldrich) and $Mn(NO_3)_2 \cdot 6H_2O$ (99.99%, Aldrich). A 25 mL aqueous solution of the transition metal nitrates was slowly dipped into 200 mL of a stirred solution of LiOH using a buret. The obtained precipitate was filtered out, washed several times with water and dried in the oven for a day. The dried precipitate was mixed with $LiOH\cdot H_2O$ in stoichiometric proportions and pressed into pellet. The pellet was heated at 480° C. for 3 hours in air, followed by annealing at 900° C. for 12 hours. The pellet was quenched to the room temperature using copper plate.

For synthesis of the ion-exchanged sample (IE-$Li(Ni_{0.5}Mn_{0.5})O_2$), as a starting material, $Na(Ni_{0.5}Mn_{0.5})O_2$ was prepared by solid-state reaction from $Na_2CO_3$ (99.5+%, Aldrich), $Ni(OH)_2$ (99.3%, J. T. Baker) and $Mn_2O_3$ (99.9+%, Aldrich). The appropriate amounts of these starting materials were wet ball-milled for 1 day. After drying, this mixture was ground using a mortar, and pressed into a pellet shape. The pellet was heated at 900° C. for 24 hours in air. The pellet was quenched to the room temperature using a copper plate. The sample was transported into the glove box filled with Ar immediately after quenching. Next, the obtained Na-containing powder was mixed with 10 times excess amount of the eutectic composition of $LiNO_3$ (99.98%, Alfa Aesar) and LiCl (99%, Mallinckrodt). The mixture was heated at 280° C. for about 5 hours in the air. After ion exchange, the mixture was rinsed with distilled water and ethanol several times, and filtered to recover the powder. The whole ion-exchange process was repeated once more in order to have complete ion-exchange. Finally, the obtained Li-containing dark brown powder was dried in the air for a day in an oven.

Figure 1B:
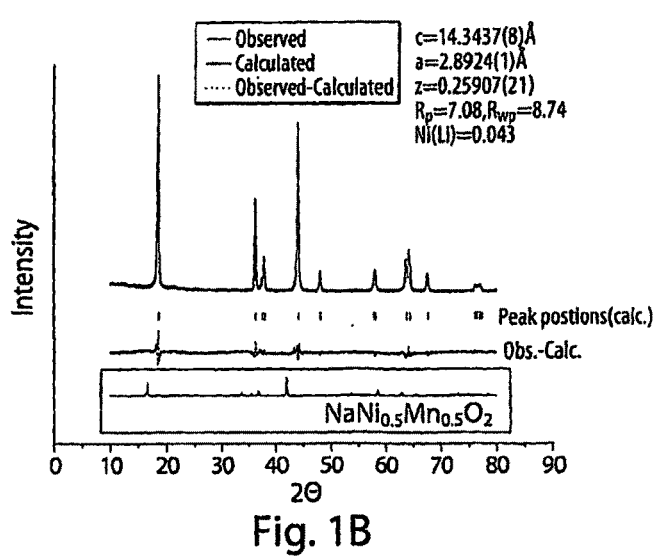

The refined structural parameters of SS—$Li(Ni_{0.5}Mn_{0.5})O_2$ was found to be in a good agreement with results for this material from the literatures (FIG. 1A, showing an XRD pattern with refined results for SS—$Li(Ni_{0.5}Mn_{0.5})O_2$). However, noticeably, there was a significant increase in the c-lattice distance from 14.28 Angstroms (Å) in SS—$Li(Ni_{0.5}Mn_{0.5})O_2$ to 14.34 Angstroms in the IE-$Li(Ni_{0.5}Mn_{0.5})O_2$ (FIG. 1B, showing an XRD pattern with refined results for IE-$Li(Ni_{0.5}Mn_{0.5})O_2$). This may indicate that the Li slab space was larger in IE-$Li(Ni_{0.5}Mn_{0.5})O_2$. Defining the Li slab space as the average distance between two oxygen layers above and below Li layer, it was calculated that the Li slab space increased from 2.59 Angstroms in SS—$Li(Ni_{0.5}Mn_{0.5})O_2$ to 2.66 Angstroms in IE-$Li(Ni_{0.5}Mn_{0.5})O_2$. The Na precursor peaks were not detected, which may imply substantially complete ion-exchange of Na and Li. Only about 0.3 wt % of Na could be detected from ICP measurements after ion exchange (inductively coupled plasma emission spectroscopy by Luvak, Boylston, Mass., USA).

Also shown in FIG. 1B, in the inset, is the XRD pattern of Na precursor. Note that the precursor peak was not observed after ion exchange. The XRD patterns were recorded using a Rigaku diffractometer equipped with a Cu-$K_\alpha$ (K-alpha) radiation by step scanning (0.01°/10 sec) in the 2θ (2 theta) range of 10° to 80°. The XRD sample was prepared to avoid any preferential orientation. The structure was refined with Fullprof.

Figure 6:
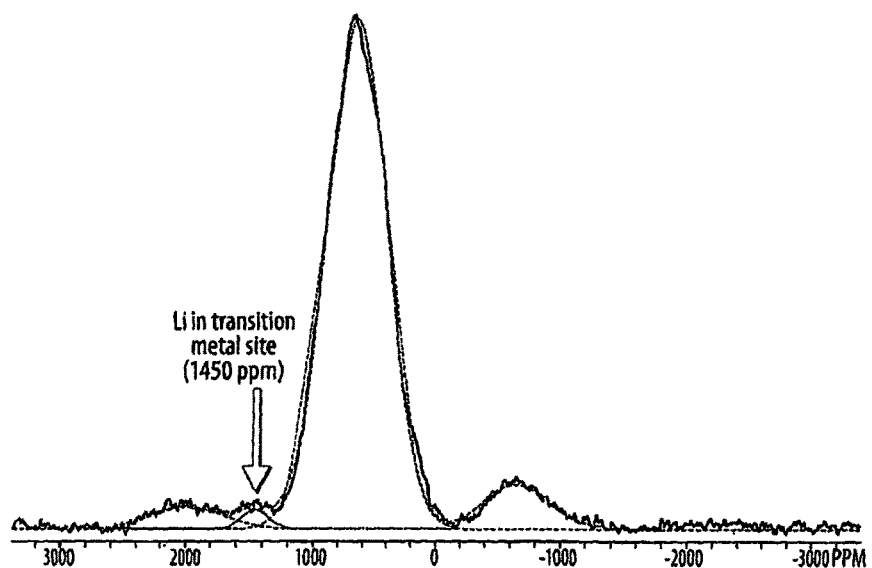
FIG. 6 illustrates a $^6$Li NMR measurement of an oxide material according to yet another embodiment of the invention.

According to the XRD data, the Li—Ni exchange was significantly reduced from about 10.9% to about 4.3%. Solid state $^6$Li NMR experiments were also independently conducted in order to verify the amount of Li—Ni exchange, shown in FIG. 6. The quantitative analysis of 1450 ppm peak in the NMR spectrum, known to correspond to Li in a transition metal site, revealed that Li—Ni exchange was even lower, about 0.5% (see below). Thus, it appeared that using a Na precursor to create a material having a better layered structure was successful.

Figure 5A:
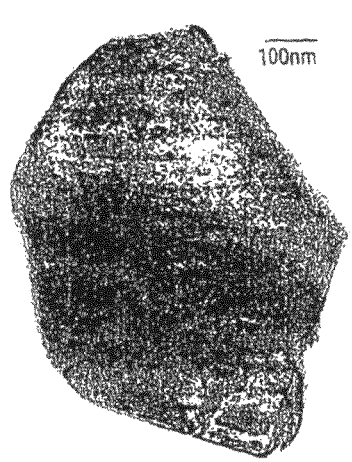
FIG. 5A-5D illustrate TEM images of certain materials of the invention, compared to other materials, according to another embodiment of the invention.
Figure 5C:
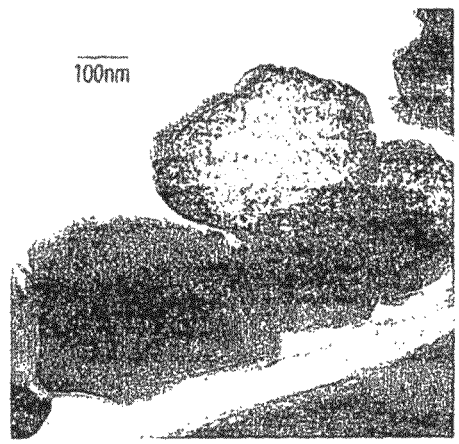
Figure 5B:
Figure 5D:
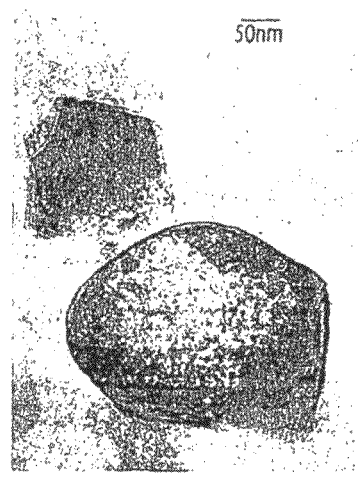

Electron microscopy experiments revealed that the crystallite size of IE-Li(Ni$_{0.5}$Mn$_{0.5}$)O$_2$ distributed around 1 micrometer, while that of SS—Li(Ni$_{0.5}$Mn$_{0.5}$)O$_2$ distributed around 0.5 micrometers (see below). Also, it was observed that IE-Li(Ni$_{0.5}$Mn$_{0.5}$)O$_2$ crystallite appeared to have a non-cubic shape, e.g., as that of a plate, while SS—Li(Ni$_{0.5}$Mn$_{0.5}$)O$_2$ crystallite is a cubic shape. The shape of crystallites indirectly indicated that IE-Li(Ni$_{0.5}$Mn$_{0.5}$)O$_2$ may have a better layered structure than SS—Li(Ni$_{0.5}$Mn$_{0.5}$)O$_2$. FIGS. 5A-5D illustrate transmission electron microscopy (TEM) images of IE-Li(Ni$_{0.5}$Mn$_{0.5}$)O$_2$ (FIGS. 5A and 5B) and SS—Li(Ni$_{0.5}$Mn$_{0.5}$)O$_2$ (FIGS. 5C and 5D). The TEM images were collected from powder samples, which were suspended on a copper grid with lacey carbon under an accelerating voltage of 200 keV on a JEOL 2000FX microscope.

The electrochemical properties of each Li(Ni$_{0.5}$Mn$_{0.5}$)O$_2$ have also been investigated and compared. In these experiments, the lithium cells were configured in the following way: Li/1M LiPF6 in EC:DMC=1:1(Merck)Li(Ni$_{0.5}$Mn$_{0.5}$)O$_2$ with carbon black (10 wt %) was used as a conductive agent and polyethylenetetrafluoride (PTFE)(5 wt %) as a binder. The cells were assembled in an argon-filled glove box and cycled at room temperature using a Maccor 2200 operating in galvanostatic mode. The electrochemical performances of the samples were evaluated upon cycling in the 3.0 V to 4.6 V potential window at various rates.

Figure 2A:
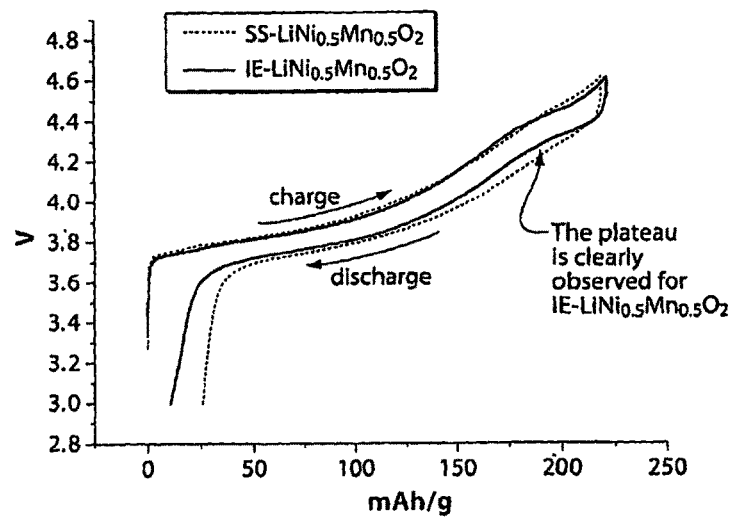
FIGS. 2A-2D illustrate charge/discharge curves of certain embodiments of the invention.
Figure 2B:
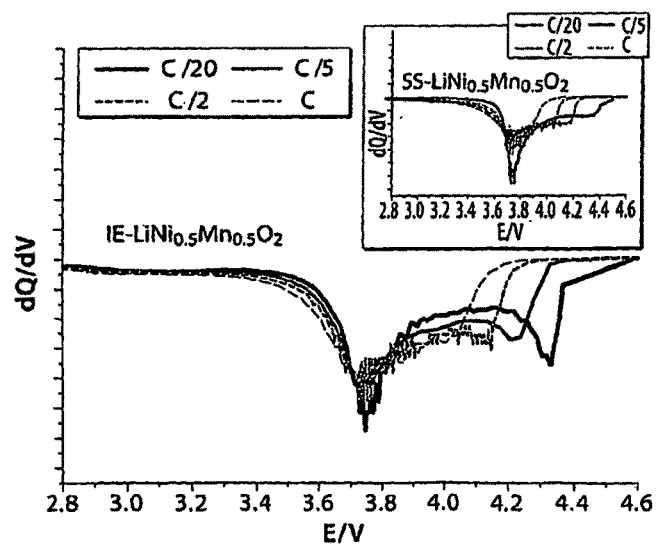

FIG. 2A shows the first cycling profiles (charge/discharge curves) of IE-Li(Ni$_{0.5}$Mn$_{0.5}$)O$_2$ and SS—Li(Ni$_{0.5}$Mn$_{0.5}$)O$_2$ at a C/20 rate (1 C=280 mA/g). While the charge/discharge behavior of IE-Li(Ni$_{0.5}$Mn$_{0.5}$)O2 was found to be similar to that of SS—Li(Ni$_{0.5}$Mn$_{0.5}$)O$_2$ at below 4 V, the plateau at 4.3 V appeared to be pronounced in IE-Li(Ni$_{0.5}$Mn$_{0.5}$)O$_2$. The different behavior at voltages higher than 4.2 V can also be seen in the dQ/dV plot (FIG. 2B, which shows discharge curves at various C-rates for IE-Li(Ni$_{0.5}$Mn$_{0.5}$)O$_2$). The inset in FIG. 2B shows SS—Li(Ni$_{0.5}$Mn$_{0.5}$)O$_2$ for comparison purposes.

While the 4.3 V peak in the dQ/dV plot was almost comparable with main 3.8 V peak in the IE-Li(Ni$_{0.5}$Mn$_{0.5}$)O2 data, only a trace of 4.3 V peak was observed in the SS—Li(Ni$_{0.5}$Mn$_{0.5}$)O$_2$ data. Since the 4.3 V plateau was observed at around x=0.6 to 0.7 for Li$_{1-x}$(Ni$_{0.5}$Mn$_{0.5}$)O$_2$, it is thus suspected that the peak is due to the Li-vacancy ordering. The absence of a transition metal in the Li layer is thus believed to enhance the Li-vacancy ordering. Therefore, the 4.3 V plateau was clearly observable in IE-Li(Ni$_{0.5}$Mn$_{0.5}$)O$_2$.

Figure 2C:
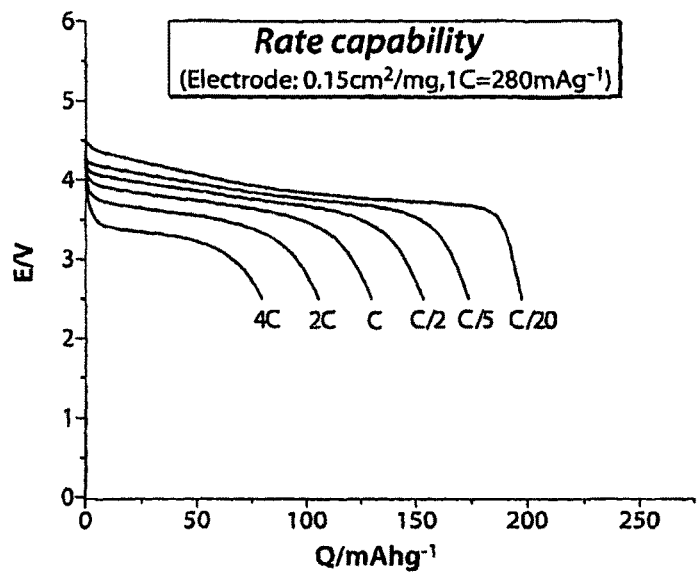
Figure 2D:
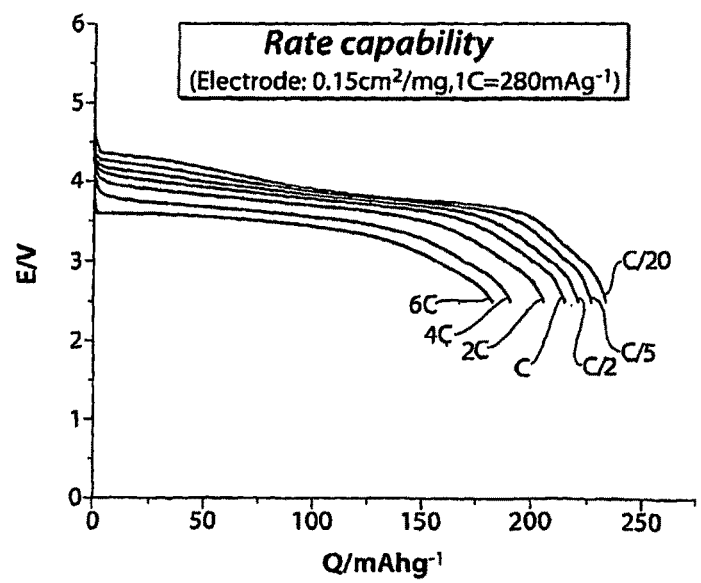

Certain electrochemical cells were also run at various C-rates in order to test rate capabilities, as shown in FIGS. 2C and 2D. It was observed that as the rate increased, the capacity of IE-Li(Ni$_{0.5}$Mn$_{0.5}$)O$_2$ became significantly higher than SS—Li(Ni$_{0.5}$Mn$_{0.5}$)O$_2$. FIG. 2C shows a rate capability test at various C-rate for SS—Li(Ni$_{0.5}$Mn$_{0.5}$)O$_2$, while FIG. 2D shows a rate capability test at various C-rate for IE-Li(Ni$_{0.5}$Mn$_{0.5}$)O$_2$. In these rate tests, the cell was charged at C/20 to 4.6 V and held at 4.6V for 5 h, then discharged at different rates.

Figure 3A:
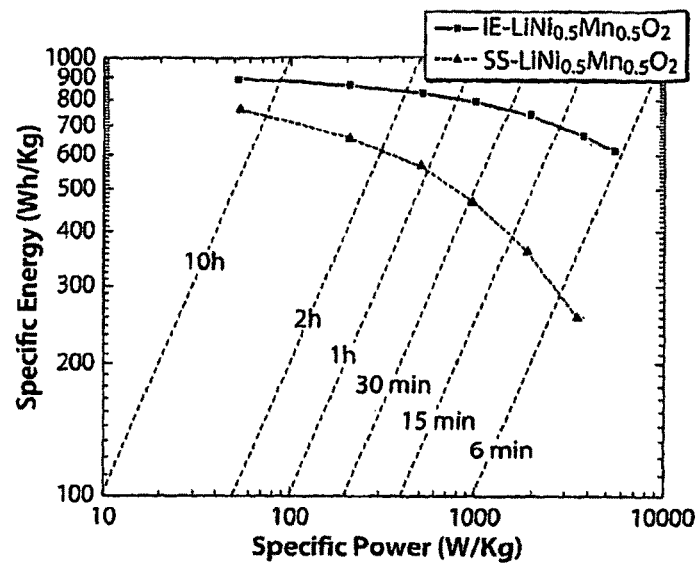
FIGS. 3A-3B illustrate the discharge capabilities of certain embodiments of the invention, as compared to other compositions.
Figure 3B:
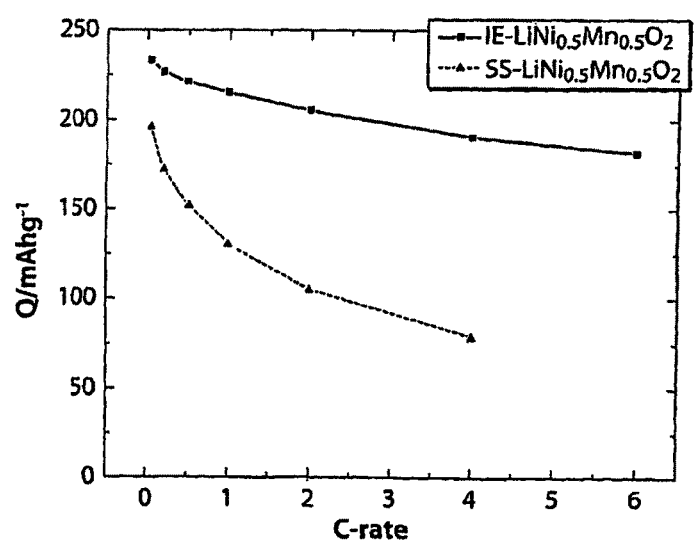

The Ragone plot in FIG. 3 shows that the rate capability of IE-Li(Ni$_{0.5}$Mn$_{0.5}$)O$_2$ was improved, as compared to SS—Li(Ni$_{0.5}$Mn$_{0.5}$)O$_2$. Only the active electrode was included in the weight. Surprisingly, even at a 6 C rate, the IE-Li(Ni$_{0.5}$Mn$_{0.5}$)O$_2$ material delivered about 183 mA h/g. In contrast, the best electrochemical data published for this material shows that it can deliver about 130 mA h/g at a 397 mA/g rate, and there is no data available for rates as high as a 6 C rate. It should be noted that the rate capability of the electrode can be affected by external parameters such as particle size and morphology; however, this electron microscopy study showed the IE-Li(Ni$_{0.5}$Mn$_{0.5}$)O$_2$ particle was actually about two times bigger than the SS—Li(Ni$_{0.5}$Mn$_{0.5}$)O$_2$ materials, implying with proper engineering optimization, IE-Li(Ni$_{0.5}$Mn$_{0.5}$)O$_2$ will have even higher rate capabilities than were shown here. The better rate capability of IE-Li(Ni$_{0.5}$Mn$_{0.5}$)O$_2$ can be attributed to the more feasible Li motion in the IE-Li(Ni$_{0.5}$Mn$_{0.5}$)O$_2$, with less of an effect of transition metal on the Li layer.

It was noted that with higher rates in discharge, the 4.3 V peak shifted to lower voltages compared to main 3.8 V peak. The 4.3 V peak eventually disappears in the dQ/dV graph (FIG. 1B). This may imply that the Li taken at the 4.3 V plateau is sluggish in motion, with a higher activation barrier. If Li stays at a more stable site due to Li-vacancy ordering, the activation barrier for the Li motion may increase.

Also in this example, first principles calculations were performed in order to understand the effect of transition metal in the Li layer and the relation to the rate capability of the material. It is believed that Li in the layered structure can diffuse from its original octahedral site, through the intermediate tetrahedral site which is face-sharing with the transition metal octahedron, to the neighboring octahedral vacancy. There are potentially two qualitatively distinct Li pathways in Li(Ni$_{0.5}$Mn$_{0.5}$)O$_2$. The one is through the tetrahedral site face-sharing with Mn and the other is with Ni. The activation barriers for those two paths have been calculated. The calculations were performed for three systems. One is within a perfect layered system without cation mixing, another is with excess Ni (8.3%) present in the Li layer without a change in the transition metal layer and the third is with the Li—Ni exchange (8.3%).

In the first principles calculations, all energies were calculated with the Spin-polarized Generalized Gradient Approximation (GGA) to Density Functional Theory, using a plane-wave basis set and the Projector-Augmented Wave method as implemented in the Vienna Ab initio Simulation Package ("VASP," Theoretical Physics Department, Institut für Materialphysik, Universität Wien, Wien, Austria). A plane-wave basis with a kinetic energy cutoff of 400 eV was used, and reciprocal-space k-point grids between 1×1×1 and 3×3×5 were used depending on the size of the supercell considered. The structures were fully relaxed. For the altered Li slab space cases, the volumes were fixed, while the ions were allowed to relax. The activation energy for Li motion was approximated as the difference between the tetrahedral site energy and the octahedral site energy. The simple zig-zag like Ni and Mn configuration was adopted for cation mixing free systems and Ni excess systems, while for Li—Ni exchange systems, the flower configuration was used for the calculations.

Figure 4:
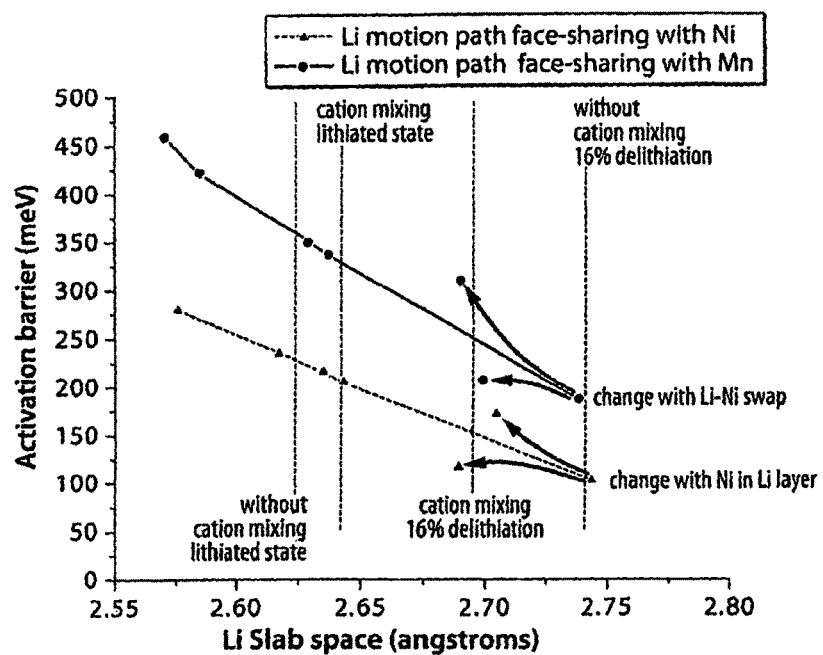
FIG. 4 illustrates Li motion of another embodiment of the invention, as calculated using density functional theory.

The fully relaxed calculations, calculated using Density Functional Theory, showed that when 8.3% of transition metal was present in the Li layer, the Li slab space was reduced from 2.641 Angstroms to 2.624 Angstroms. In order to see the effect of change in the Li slab space on Li mobility, the activation barriers for Li motion were calculated as a function of Li slab space in FIG. 4. This figure shows that even a tiny decrease in the Li slab space may result in a appreciable increase in the activation barrier. For instance, an only about 0.02 Angstrom reduction in the lithiated state resulted in a 20 meV to 30 meV increase of the activation barrier. This behavioral difference between a perfect layered system and a cation mixed system was observed when some of the Li was removed. During the early delithiation, the Li slab space appeared to increase, since the electrostatic repulsion between the transition metal slabs increased. This lead to the more feasible Li motion in the most of layered structure. However, when the transition metal is in the Li layer, the increase in the Li slab space with delithiation significantly decreased. While the Li slab space increased from 2.641 Angstroms to 2.740 Angstroms in the perfect layered system, the space increased only from 2.624 Angstroms to 2.695 Angstroms with a transition metal in the Li layer. This may lead to a sluggish Li motion in cation mixed $Li(Ni_{0.5}Mn_{0.5})O_2$.

Example 2

This example illustrates an example of a screening test to determine $Li(Ni_{0.5}Mn_{0.5})O_2$, and in particular, when the $Li(Ni_{0.5}Mn_{0.5})O_2$ is "well-layered" (i.e., has very little cation mixing between transition metals and Li). Such oxide materials can be synthesized, for example, by ion-exchanging, in $Na(Ni_{0.5}Mn_{0.5})O2$ materials, Na with Li. Residual Na can affect the structural aspects of the material and lead to poor crystallinity, stacking faults and the reduction of available Li sites. Thus, it is important to determine the degree of ion exchange of Na and Li.

In this example, a $Na(Ni_{0.5}Mn_{0.5})O_2$ was prepared using methods similar to those described in Example 1, and subjected to ion exchange for various durations, using 10 times excess amount of the eutectic composition of $LiNO_3$ and LiCl (also using methods similar to those described in Example 1). Durations studied were 1 hour, 5 hours, 10 hours, 1+5 hours, and 5+5 hours. (For the 1+5 hours and 5+5 hours experiments, after 1 or 5 hours, respectively, the oxide material was removed from the ion exchange (Li) media, washed, and then exposed to fresh Li ion exchange media for an additional 5 hours. In these experiments, since Li in solution can diffuse into the precursor oxide material and Na can diffuse out into solution, the concentration differences of each of Li and Na becomes smaller during the ion exchange process, and using fresh ion exchange solution with new salts may reset this process and thereby provide higher driving forces.

The ion exchange of Na with Li can be understood as a diffusional process with the concentration difference of Na and Li between the material and solution acting as a driving force. In addition, the chemical potential of Li is lower in the material than that of Na, providing an extra driving force for Li to enter and Na to leave the material. During the ion exchange, Na diffuses out of the material, while Li diffuses into the material. As such, the completeness of ion exchange can be controlled by controlling factors such as the exchange time, temperature, diffusional length (crystallite size of Na precursor), the driving force (concentration difference), etc.

Figure 7A:
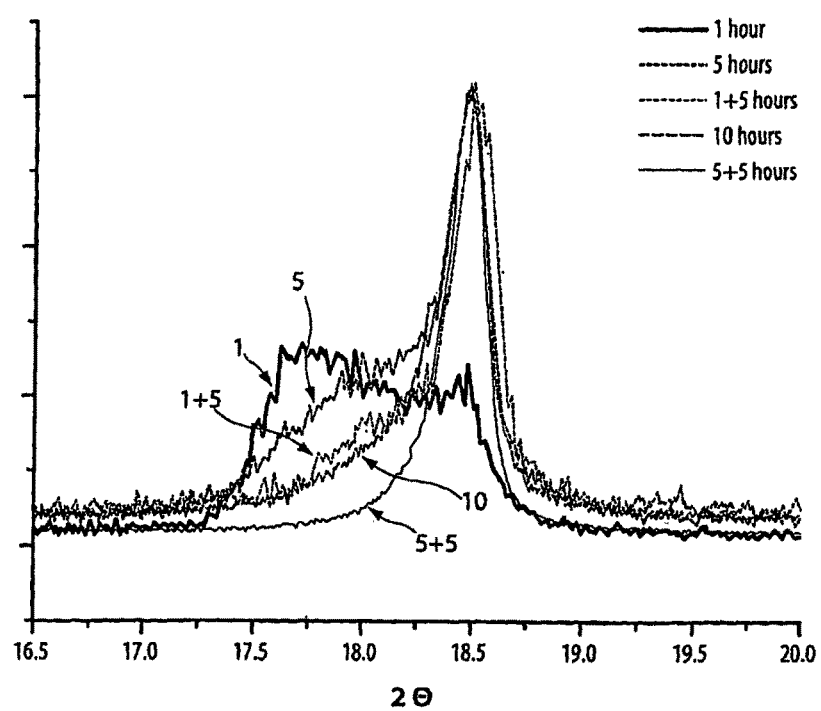
FIGS. 7A-7B illustrates ion exchange in an oxide material according to still another embodiment of the invention.

Substantially complete ion exchange of Na and Li is evidenced in FIG. 7A, as can be seen from the 003 peak of the oxide material in x-ray diffraction. In contrast, a broad peak indicates poor crystallinity and insufficient ion exchange. As shown in FIG. 7A, the material poorly crystallized with only 1 hour of ion exchange, while a well-defined material was obtained with longer ion-exchange, for example starting at 5 hours of ion exchange. It should be noted that in prior studies (J. M. Paulsen and J. R. Dahn, "$O_2$-Type $Li_{2/3}[Ni_{1/3}Mn_{2/3}]O_2$: A New Layered Cathode Material for Rechargeable Lithium Batteries. II. Structure, Composition, and Properties," *J. Electrochem. Soc.*, 147(7):2478-2485 (2000)), only 1 hour of ion exchange was used, which studies resulted in insufficient ion exchange and materials exhibiting substantial Na impurities, causing poor crystallinity and other undesirable characteristics.

Figure 7B:
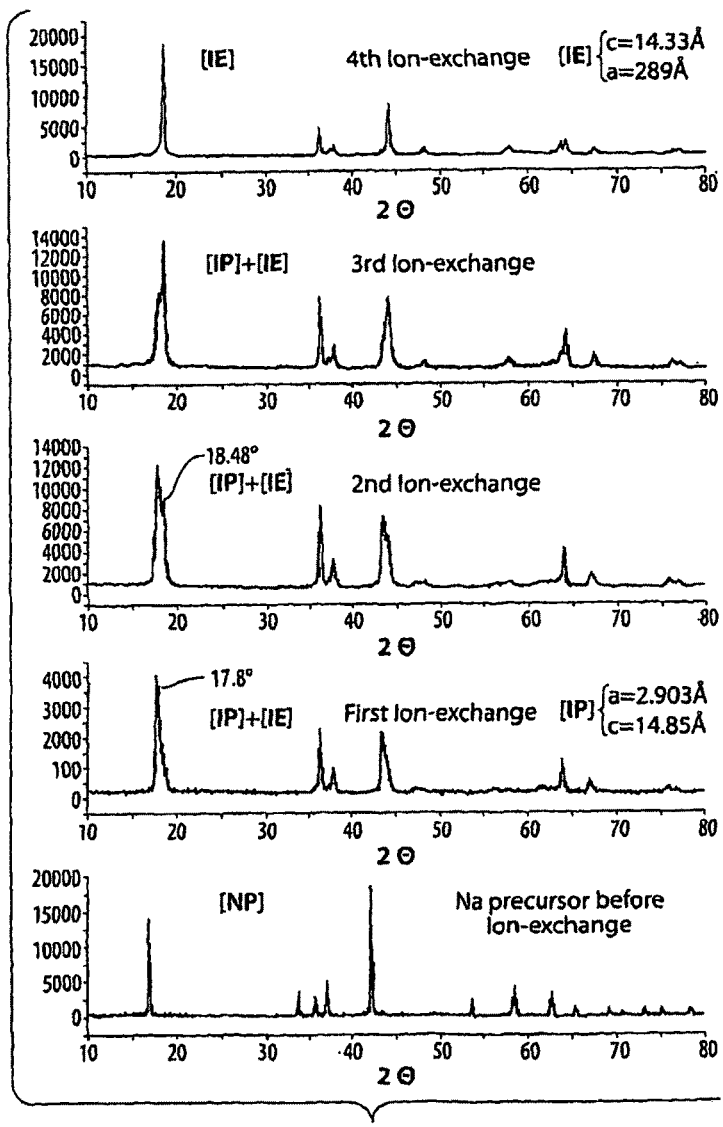

FIG. 7B shows various "snapshots" of the ion exchange process. In the course of the ion exchange from $Na(Ni_{0.5}Mn_{0.5})O_2$, the intermediate phase (called "[IP]") is formed before the $Li(Ni_{0.5}Mn_{0.5})O_2$ phase is formed. It is seen that there are three different phases observed distinctly, i.e. $Na(Ni_{0.5}Mn_{0.5})O_2$ ("[NP]"), $Li(Ni_{0.5}Mn_{0.5})O_2$ ("[IE]") and IP ("[IP]").

At the initial stage of ion-exchange, IP (main peak at about 17.8° appears as a main phase with a trace amount of IE. Further ion exchange reveals IE (main peak at about 18.4° becomes dominant at the cost of IP. The refinement of the IP XRD pattern shows that the structure (IP) is identical to the material reported in the literature mentioned above. These series of XRD patterns show that $Li(Ni_{0.5}Mn_{0.5})O_2$ prepared here is not the same as that reported in the literature, as the material reported in Paulsen and Dahn, is merely an intermediate phase formed during this process.

Example 3

This example illustrates a comparison of measured lattice parameters between IE-$Li(Ni_{0.5}Mn_{0.5})O_2$, prepared using the systems and methods of the present invention, and SS—$Li(Ni_{0.5}Mn_{0.5})O_2$. These materials were prepared using techniques similar to those described in Example 1. The lattice parameters were measured using standard XRD techniques.

Figures 8A, 8B, 8C:
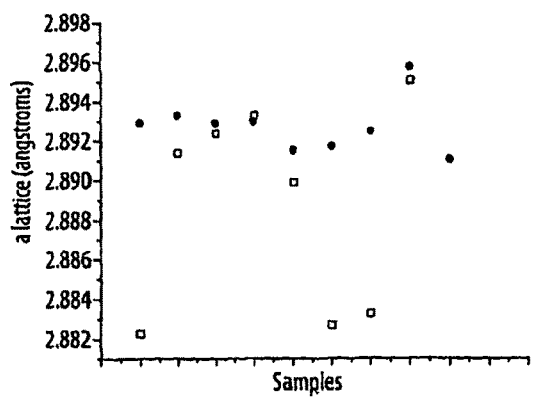
FIGS. 8A-8C illustrates various lattice parameters in accordance with one embodiment of the invention.

FIG. 8 shows the a and c lattice parameters (FIGS. 8A and 8B, respectively) as well as the ratio c/a (FIG. 8C) for IE-$Li(Ni_{0.5}Mn_{0.5})O_2$ materials (circles) and for SS—$Li(Ni_{0.5}Mn_{0.5})O_2$ materials (squares). The lattice parameters c and a are used in the typical hexagonal setting of the O3 structure.

In FIG. 8A, there is no clear distinction for a lattice parameters for IE-$Li(Ni_{0.5}Mn_{0.5})O_2$ materials and SS—$Li(Ni_{0.5}Mn_{0.5})O_2$ materials. However, in FIG. 8B, the IE-$Li(Ni_{0.5}Mn_{0.5})O_2$ materials and the SS—$Li(Ni_{0.5}Mn_{0.5})O_2$ materials could be readily distinguished on the basis of their c lattice parameters. Similarly, in FIG. 8C, on the basis of the ratio of the c lattice parameters and the a lattice parameters, the IE-$Li(Ni_{0.5}Mn_{0.5})O_2$ materials could be readily distinguished from the SS—$Li(Ni_{0.5}Mn_{0.5})O_2$ materials.

Example 4

$Li(Ni_{2/3}Nb_{1/3})O_2$ is discussed in this prophetic example. Because of the high valence of $Nb^{5+}$ in this material, it cannot be made into a well-ordered using prior art techniques. $Nb^{5+}$ will electrostatically attract $Li^+$ which will lead to mixing of Li and Ni.

Performing first principles calculations based on the fundamental equations of quantum mechanics with the VASP program shows that a well-ordered layered structure is 10 meV/formula unit higher in energy than a similar structure exhibiting Li/Ni disorder. This indicates that for $Li(Ni_{2/3}Nb_{1/3})O_2$, the well-ordered structure can not be made by direct synthesis using prior art techniques, as the well-ordered structure is higher in energy.

In contrast, however, similar calculations using $Na(Ni_{2/3}Nb_{1/3})O_2$ instead of $Li(Ni_{2/3}Nb_{1/3})O_2$ show that, in this case, a well-ordered layered structure is 20 meV/formula unit below a similar structure with Li/Ni disorder. Thus, for Na(Ni$_{2/3}$Nb$_{1/3}$)O$_2$ the ordered structure can be directly synthesized. Then, ion exchange of Na with Li in the Na(Ni$_{2/3}$Nb$_{1/3}$)O$_2$ material, using the ion exchange procedures described herein will lead to a well-ordered Li(Ni$_{2/3}$Nb$_{1/3}$)O$_2$ material.

Example 5

Figure 10A:
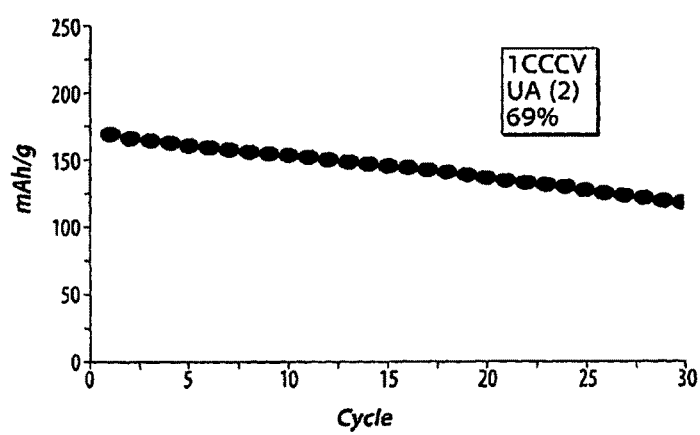
FIGS. 10A-10B illustrate cycle tests using an oxide material according to one embodiment of the invention.
Figure 10B:
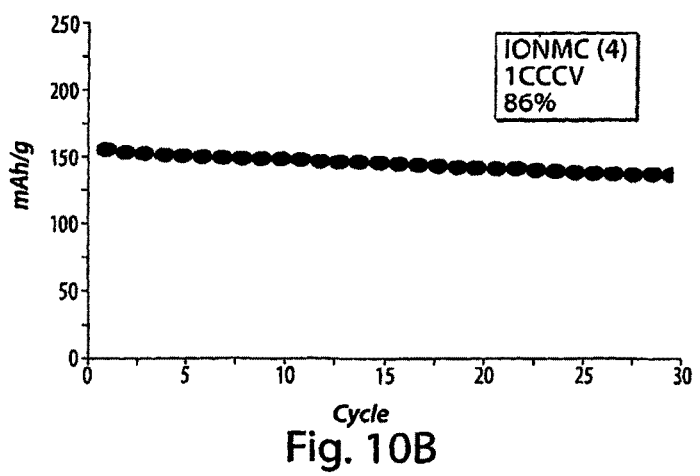

In this example, cycle tests using Li(Ni$_{0.45}$Co$_{0.01}$Mn$_{0.45}$)O$_2$ and Li(Ni$_{0.45}$Mg$_{0.1}$Mn$_{0.45}$)O$_2$ are demonstrated. The cycle tests are shown in FIGS. 10A and 10B.

As a starting material for the ion exchange, Na(Ni$_{0.45}$Co$_{0.1}$Mn$_{0.45}$)O2 was prepared by solid-state reaction from Na$_2$CO$_3$ (Aldrich), Ni(OH)$_2$ (Alfa Aesar), CoC$_2$O$_4$.2H$_2$O (Alfa Aesar) and Mn$_2$O$_3$ (Aldrich). The appropriate amounts of these starting materials were wet ball-milled for 1 day. After drying, this mixture was ground using a mortar, and pressed into a pellet. The pellet was heated at 900° C. for 24 hours in air. The pellet was quenched to room temperature using a copper plate and transported into a glove box filled with Ar immediately after quenching.

For the ion exchange experiments, the powder was mixed with 10 times excess amount of the eutectic composition of LiNO$_3$ (Alfa Aesar) and LiCl (Mallinckrodt). The mixture was heated at 280° C. for 5 hours in air. After ion exchange, the mixture was rinsed with water and ethanol (or methanol) several times, and filtered to recover the powder. The whole ion-exchange process was repeated once more in order to have complete ion exchange. Finally, Li-containing powder was dried in air for a day in an oven.

Figure 11A:
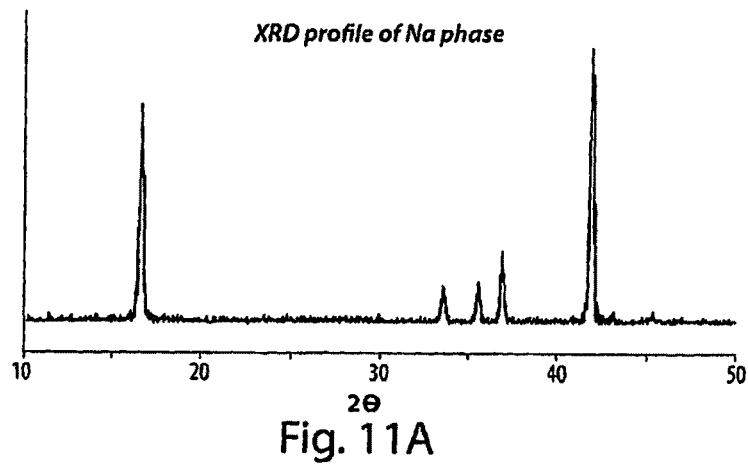
FIGS. 11A-11B illustrate XRD patterns for certain materials of the invention.
Figure 11B:
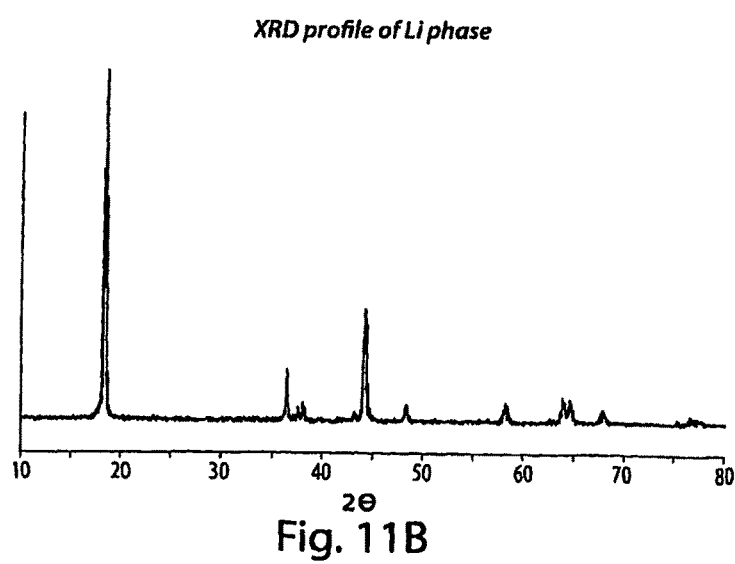

The XRD profiles of the starting material (Na(Ni$_{0.45}$Co$_{0.1}$Mn$_{0.45}$)O$_2$ and the final, ion-exchanged Li(Ni$_{0.45}$Co$_{0.1}$Mn$_{0.45}$)O$_2$ material are also illustrated in FIGS. 11A and 11B, respectively. These were recorded using a Rigaku diffractometer equipped with a Cu-K$_\alpha$ (K-alpha) radiation by step scanning (0.01°/10 sec) in the 2θ (2 theta) range of 10°-80°. The XRD samples were carefully prepared to avoid preferential orientation. As can be seen, FIG. 11B showed no Na phase, indicating complete ion exchange of Li with Na.

The lithium cells, used for testing the materials, were configured in the following way. Li/1M LiPF$_6$ in EC: DMC=1:1 (Merck)/LiNi$_{0.45}$Co$_{0.01}$Mn$_{0.45}$O$_2$ with carbon black (15 wt %) used as conductive agent and polyethylenetetrafluoride (PTFE)(5 wt %) as binder. The cells were assembled in an argon-filled glove box and cycled at room temperature using a Maccor 2200 operating in galvanostatic mode. The electrochemical performances of the samples were evaluated upon cycling in the 3.0 V-4.5 V potential window at a rate of 1 C (280 mA/g) in a CCCV (constant current constant voltage) mode.

FIG. 10A shows the cycling behavior of electrode containing the material without Co doping (IE-LiNi$_{0.5}$Mn$_{0.5}$O$_2$). In comparison, FIG. 10B shows the cycling behavior of the electrode-containing material with 10% Co doping (LiNi$_{0.45}$Co$_{0.1}$Mn$_{0.45}$O$_2$). It was observed that LiNi$_{0.45}$Co$_{0.1}$Mn$_{0.45}$O$_2$ retained relatively more capacity after 30 cycles at a rate of 1 C (69% vs. 86%).

Example 6

Figure 12A:
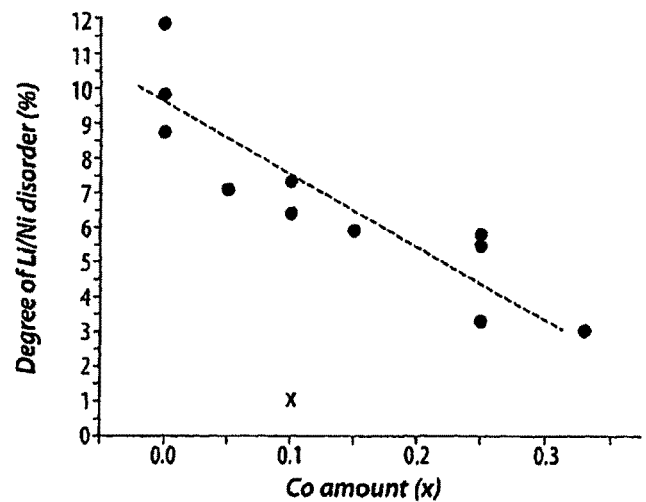
FIGS. 12A-12B illustrate an oxide material comprising cobalt substitution, in one embodiment of the invention.

The example illustrates that strategies similar to those described above can be applied to a compound with a small amount of Co substitution (greater than 0% and less than about 25%). When Co is substituted less than 33% in the transition metal sites, the material obtained from conventional solid state route may contain significant Li/Ni disorder in the structure, as shown in FIG. 12A (circles). This significant amount of Li/Ni disorder is believed to cause a deterioration of electrochemical performance. Thus, as discussed in this example, a well layered Na phase can be synthesized first, then ion exchanged with Li at relatively low temperature without significant structural change.

For synthesis of the ion-exchanged sample IE-Li(Ni$_{0.45}$Co$_{0.1}$Mn$_{0.45}$)O$_2$ as a starting material for the ion exchange, Na(Ni$_{0.45}$Co$_{0.1}$Mn$_{0.45}$)O$_2$ was prepared by solid-state reaction from Na$_2$CO$_3$ (Aldrich), Ni(OH)$_2$ (Alfa Aesar), CoC$_2$O$_4$.2H$_2$O (Alfa Aesar) and Mn$_2$O$_3$ (Aldrich). The appropriate amounts of these starting materials were wet ball-milled for 1 day. After drying, this mixture was ground using a mortar, and pressed into a pellet. The pellet was heated at 900° C. for 24 hours in air. The pellet was then quenched to room temperature using a copper plate.

Figure 12B:
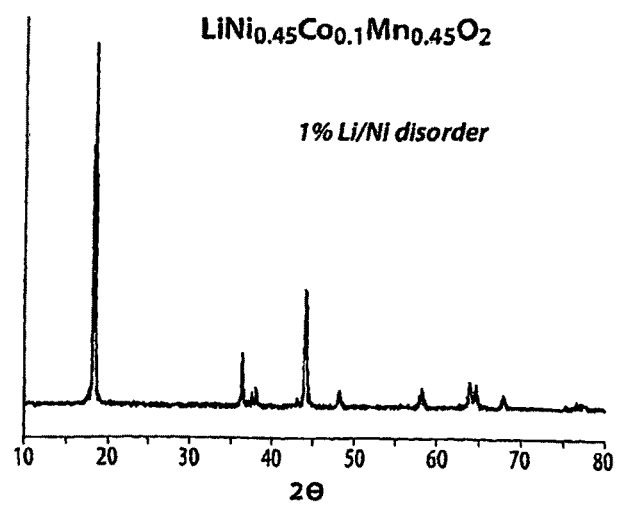

The sample was transported into the glove box filled with Ar immediately after quenching. Next, the obtained Na-containing powder was mixed with 10 times excess amount of the eutectic composition of LiNO$_3$ (99.98%, Alfa Aesar) and LiCl (99%, Mallincicrodt). The mixture was heated at 280° C. for about 5 hours in the air. After ion exchange, the mixture was rinsed with distilled water and ethanol several times, and filtered to recover the powder. The whole ion exchange process was repeated once more in order to have complete ion exchange. Finally, the obtained Li-containing powder was dried in the air for a day in an oven. FIGS. 12A and 12B show that the obtained Li powder (indicated by an "x") has significantly less Li/Ni disorder, according to the Rietveld refinement.

Example 7

The example illustrates that small amount of Ca can be incorporated into structure with strategies similar to those described above.

For synthesis of the ion exchanged sample IE-Li$_{0.9}$Ca$_{0.05}$(Ni$_{0.5}$Mn$_{0.5}$)O$_2$ as a starting material for the ion exchange, Na$_{0.9}$Ca$_{0.05}$(Ni$_{0.5}$Mn$_{0.5}$)O$_2$ was prepared by solid-state reaction from Na$_2$CO$_3$ (Aldrich), CaCO$_3$ (Aldrich), Ni(OH)$_2$ (Alfa Aesar), and Mn$_2$O$_3$ (Aldrich). The appropriate amounts of these starting materials were wet ball-milled for 1 day. After drying, this mixture was ground using a mortar, and pressed into a pellet. The pellet was heated at 900° C. for 24 hours in air. The pellet was quenched to room temperature using a copper plate.

Figure 13:
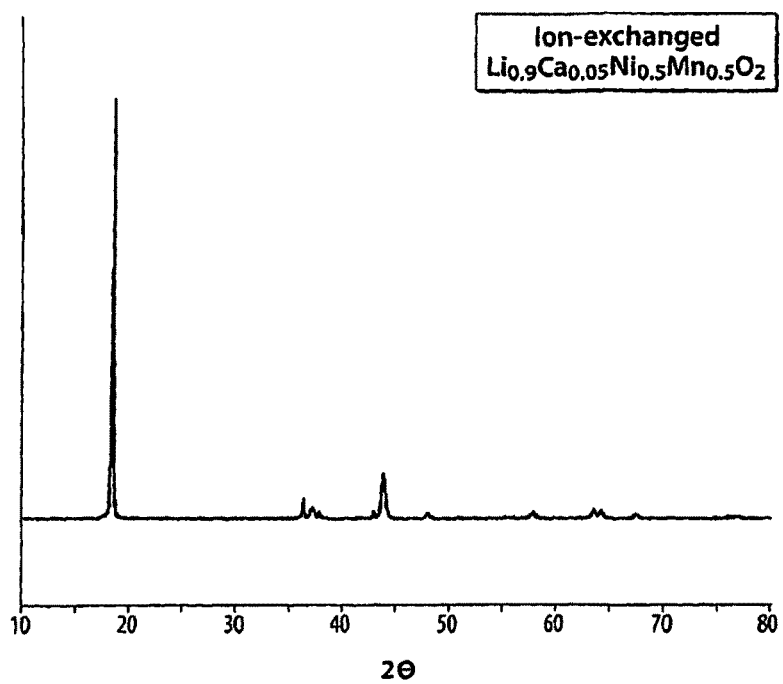
FIG. 13 illustrates an oxide material comprising calcium substitution, in another embodiment of the invention.

The sample was transported into the glove box filled with Ar immediately after quenching. Next, the obtained Na-containing powder was mixed with 10 times excess amount of the eutectic composition of LiNO$_3$ (99.98%, Alfa Aesar) and LiCl (99%, Mallinckrodt). The mixture was heated at 280° C. for about 5 hours in the air. After ion exchange, the mixture was rinsed with distilled water and ethanol several times, and filtered to recover the powder. The whole ion exchange process was repeated once more in order to have complete ion exchange. Finally, the obtained Li-containing powder was dried in the air for a day in an oven. FIG. 13 shows the powder diffraction of Li phase obtained with Cu-K$_\alpha$ (Cu-K(alpha)) radiation.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A composition, comprising:
an oxide, having a structure:

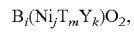

$B_i(Ni_j T_m Y_k)O_2,$ wherein:
i is greater than 0, j is greater than about 0.2, k is greater than about 0.2, m is less than about 0.25, and (j+k+m) is between about 0.95 and about 1.05;
T is cobalt and/or aluminum;
Y represents one or more atoms, each independently selected from the group consisting of transition metals other than cobalt, Group 13 elements other than aluminum, Group 14 elements, Group 15 elements, Group 16 elements, or magnesium;
B represents one or more atoms that are not T or Y such that at least about 90% of $B_i$ is lithium;
B has a combined valency of $Z_B$ and Y has a combined valency of $Z_Y$, (i $Z_B$+2j+k $Z_Y$+3m) being between about 3.8 and 4.2; and
the oxide comprises a plurality of first, repeating atomic planes comprising B and a plurality of second, repeating atomic planes comprising Ni and/or Y and/or T, the plurality of first, repeating atomic planes having less than about (22.5(⅓−m)) % by number of Ni and/or Y and/or T compared to the total number of atoms present within the plurality of first, repeating atomic planes, as determined by $^6$Li NMR, wherein the oxide comprises an O3 crystal structure.

2. The composition of claim 1, wherein the oxide has a structure:

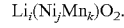

$Li_i(Ni_j Mn_k)O_2.$

3. The composition of claim 2, wherein (j/k) is between about 0.8 and about 1.2.

4. The composition of claim 3, wherein (j/k) is between about 0.9 and about 1.1.

5. The composition of claim 2, wherein the plurality of first, repeating atomic planes has less than about 4% by number of Ni and/or Y.

6. The composition of claim 5, wherein the plurality of first, repeating atomic planes has less than about 3% by number of Ni and/or Y.

7. The composition of claim 6, wherein the plurality of first, repeating atomic planes has less than about 2% by number of Ni and/or Y.

8. The composition of claim 7, wherein the plurality of first, repeating atomic planes has less than about 1% by number of Ni and/or Y.

9. The composition of claim 2, wherein the plurality of second atomic planes has less than about 4% by number of Li.

10. The composition of claim 9, wherein the plurality of second atomic planes has less than about 3% by number of Li.

11. The composition of claim 10, wherein the plurality of second atomic planes has less than about 2% by number of Li.

12. The composition of claim 11, wherein the plurality of second atomic planes has less than about 1% by number of Li.

13. The composition of claim 2, wherein the oxide, when used as a positive electrode in an electrochemical cell against a Li anode, charged to 4.6 V, gives, upon discharge to 2.5 V, a capacity of at least about 150 mA h/g at a current rate of at least 280 mA/g.

14. The composition of claim 13, wherein the oxide has a capacity of at least about 170 mA h/g.

15. The composition of claim 14, wherein the oxide has a capacity of at least about 200 mA h/g.

16. The composition of claim 2, wherein the plurality of first, repeating atomic planes has at least about 95% by number of Li atoms.

17. The composition of claim 16, wherein the plurality of first, repeating atomic planes has at least about 96% by number of Li atoms.

18. The composition of claim 17, wherein the plurality of first, repeating atomic planes has at least about 97% by number of Li atoms.

19. The composition of claim 18, wherein the plurality of first, repeating atomic planes has at least about 98% by number of Li atoms.

20. The composition of claim 19, wherein the plurality of first, repeating atomic planes has at least about 99% by number of Li atoms.

21. The composition of claim 2, wherein the oxide has a structure:

$Li(Ni_{0.5}Mn_{0.5})O_2$.

22. A composition, comprising:
an oxide, having a structure:

$B_i(Ni_jT_mY_k)O_2$, wherein:
- i is greater than 0, j is greater than about 0.2, k is greater than about 0.2, m is less than about 0.25, and (j+k+m) is between about 0.95 and about 1.05;
- T is cobalt and/or aluminum;
- Y represents one or more atoms, each independently selected from the group consisting of transition metals other than cobalt, Group 13 elements other than aluminum, Group 14 elements, Group 15 elements, Group 16 elements, or magnesium;
- B represents one or more atoms that are not T or Y such that at least about 90% of $B_i$ is lithium;
- B has a combined valency of $Z_B$ and Y has a combined valency of $Z_y$, (i $Z_B$+2j+k $Z_Y$+3m) being between about 3.8 and 4.2; and
- the oxide comprises a plurality of first, repeating atomic planes comprising B and a plurality of second, repeating atomic planes comprising Ni and/or Y and/or T, the plurality of first, repeating atomic planes having at least about 90% by number of B atoms compared to the total number of atoms present within the first, repeating atomic planes, the oxide having a hexagonal crystal structure, and an a lattice parameter and a c lattice parameter such that c/a is greater than about 4.95, wherein the oxide comprises an O3 crystal structure.

23. A composition, comprising:
an oxide, having a structure:

$B_i(Ni_jT_mY_k)O_2$, wherein:
- i is greater than 0, j is greater than about 0.2, k is greater than about 0.2, m is less than about 0.25, and (j+k+m) is between about 0.95 and about 1.05;
- T is cobalt and/or aluminum;
- Y represents one or more atoms, each independently selected from the group consisting of transition metals other than cobalt, Group 13 elements other than aluminum, Group 14 elements, Group 15 elements, Group 16 elements, or magnesium;
- B represents one or more atoms that are not T or Y such that at least about 90% of $B_i$ is lithium;
- B has a combined valency of $Z_B$ and Y has a combined valency of $Z_y$, (i $Z_B$+2j+k $Z_Y$+3m) being between about 3.8 and 4.2; and
- the oxide, when used as a positive electrode in an electrochemical cell against a Li anode, charged to 4.6 V, gives, upon discharge to 2.5 V, a capacity of at least about 120 mA h/g at a current rate of at least 280 mA/g, wherein the oxide comprises an O3 crystal structure.

* * * * *